(12) United States Patent
Zhao et al.

(10) Patent No.: US 12,535,431 B2
(45) Date of Patent: Jan. 27, 2026

(54) SAMPLE INSPECTION WITH MULTIPLE MEASUREMENT MODES

(71) Applicant: KLA Corporation, Milpitas, CA (US)

(72) Inventors: Guoheng Zhao, Palo Alto, CA (US);
Bret Whiteside, Gilroy, CA (US);
Daniel Kavaldjiev, San Jose, CA (US);
Zhiwei Xu, Sunnyvale, CA (US);
Stephen Biellak, Sunnyvale, CA (US)

(73) Assignee: KLA Corporation, Milpitas, CA (US)

( * ) Notice: Subject to any disclaimer, the term of this patent is extended or adjusted under 35 U.S.C. 154(b) by 173 days.

(21) Appl. No.: 18/581,858

(22) Filed: Feb. 20, 2024

(65) Prior Publication Data
US 2025/0264414 A1    Aug. 21, 2025

(51) Int. Cl.
*G01N 21/88* (2006.01)
*G01N 21/33* (2006.01)

(52) U.S. Cl.
CPC ......... *G01N 21/8806* (2013.01); *G01N 21/33* (2013.01); *G01N 21/8851* (2013.01); *G01N 2021/8848* (2013.01); *G01N 2201/0638* (2013.01)

(58) Field of Classification Search
CPC ........... G01N 2021/8848; G01N 21/33; G01N 21/8806; G01N 21/8851; G01N 2201/0638; G01N 2021/8845; G01N 21/9501
USPC ....................................................... 356/519
See application file for complete search history.

(56) References Cited

U.S. PATENT DOCUMENTS

| | | |
|---|---|---|
| 10,089,547 B2 | 10/2018 | Shemesh |
| 10,317,347 B2 | 6/2019 | Palomba et al. |
| 10,942,135 B2 | 3/2021 | Leong et al. |
| 10,948,423 B2 | 3/2021 | Liu et al. |
| 2015/0054937 A1 | 2/2015 | Lippert et al. |
| 2016/0291479 A1 | 10/2016 | Feijen et al. |
| 2019/0195689 A1 | 6/2019 | McQuilkin et al. |

OTHER PUBLICATIONS

Korean Intellectual Property Office, International Search Report and Written Opinion received in International Application No. PCT/US2025/016332, May 29, 2025, 11 pages.

*Primary Examiner* — Tri T Ton
(74) *Attorney, Agent, or Firm* — Suiter Swantz IP

(57) ABSTRACT

An inspection system may include an illumination source configured to generate an illumination beam with multiple wavelengths, an illumination sub-system including one or more illumination optics to direct the illumination beam to a sample at an off-axis angle, and an imaging sub-system. The system may include an objective lens to collect sample light, where the objective lens exhibits chromatic aberration within a spectrum of the illumination beam. The system may include one or more detectors to image the sample. A size of a point spread function (PSF) of the imaging sub-system relative to a pixel size of at least one of the one or more detectors may be adjustable. The system may include a tunable spectral filter with an adjustable linewidth configured to selectively adjust a spectrum of at least one of the illumination beam or the sample light.

25 Claims, 16 Drawing Sheets

SAMPLE INSPECTION WITH MULTIPLE MEASUREMENT MODES

TECHNICAL FIELD

The present disclosure relates generally to particle inspection and, more particularly, to dark-field particle inspection with multiple modalities having different illumination linewidths.

BACKGROUND

Particle detection systems are commonly utilized in semiconductor processing lines to identify defects or particulates on samples (e.g., wafers) which may or may not have films or other structures. In general, detection sensitivity is impacted by parameters of an inspection system such as, but not limited to wavelength or power of illumination. For example, sensitivity may generally improve with increasing power and decreasing wavelength. In some cases, it may be desirable to perform defect inspection using relatively short wavelengths such as, but not limited to, wavelengths in deep ultraviolet (DUV) or vacuum ultraviolet (VUV) spectral regions.

Achieving high powers at such short wavelengths presents multiple practical challenges. For example, a continuous-wave (CW) laser source providing DUV and/or VUV emission may include a primary laser cavity to generate laser light at a first wavelength and one or more additional resonator cavities to provide frequency conversion of the laser light to reach the desired wavelength. However, such a system may be relatively difficult to manufacture, costly, and sensitive to environmental factors such as temperature fluctuations or vibrations. As another example, a pulsed laser source providing DUV and/or VUV emission may be relatively easier to fabricate and may also be more cost effective. However, pulsed laser sources inherently have larger spectral linewidths than CW laser sources, which may result in chromatic dispersion in an inspection system that may degrade the achievable resolution and/or require costly aberration-corrected optics.

There is therefore a need to develop systems and methods that mitigate the deficiencies addressed above.

SUMMARY

In embodiments, the techniques described herein relate to an inspection system including an illumination source configured to generate an illumination beam; an illumination sub-system including one or more illumination optics configured to direct the illumination beam to a sample; an imaging sub-system including an objective lens configured to collect sample light from the sample in response to the illumination beam, where the objective lens exhibits chromatic aberration within a spectrum of the illumination beam; and one or more detectors to image the sample based on at least a portion of the sample light collected by the objective lens, where an image pixel size is adjustable, where the image pixel size is a size of pixels of the one or more detectors projected to a plane of the sample; and a tunable spectral filter with an adjustable linewidth configured to selectively adjust a spectrum of at least one of the illumination beam or the sample light, where the imaging sub-system and the tunable spectral filter are configurable according to at least a first measurement mode and a second measurement mode, where the first measurement mode provides a relatively larger linewidth and a relatively larger image pixel size than the second measurement mode.

In embodiments, the techniques described herein relate to an inspection system, where the image pixel size is adjustable by controlling a magnification of the imaging sub-system.

In embodiments, the techniques described herein relate to an inspection system, where the first measurement mode provides a relatively higher chromatic aberration by the objective lens than the second measurement mode.

In embodiments, the techniques described herein relate to an inspection system, further including a controller communicatively coupled to at least one of the tunable spectral filter or the imaging sub-system, where the controller includes one or more processors configured to execute program instructions causing the one or more processors to receive one or more images of the sample from the one or more detectors; and at least one of identify or characterize one or more defects on the sample based on the one or more images.

In embodiments, the techniques described herein relate to an inspection system, where the illumination source includes a pulsed laser.

In embodiments, the techniques described herein relate to an inspection system, where illumination beam includes pulses with temporal pulse widths greater than approximately 1 picometer.

In embodiments, the techniques described herein relate to an inspection system, where illumination beam includes pulses with temporal pulse widths greater than approximately 10 picometers.

In embodiments, the techniques described herein relate to an inspection system, where the tunable spectral filter adjusts the spectrum of the illumination beam.

In embodiments, the techniques described herein relate to an inspection system, where the tunable spectral filter is located within the illumination source.

In embodiments, the techniques described herein relate to an inspection system, where the tunable spectral filter is located between the illumination source and the sample.

In embodiments, the techniques described herein relate to an inspection system, where the tunable spectral filter adjusts the spectrum of the sample light.

In embodiments, the techniques described herein relate to an inspection system, where the spectrum of the illumination beam includes wavelengths in an ultraviolet spectral (UV) range or lower.

In embodiments, the techniques described herein relate to an inspection system, where the tunable spectral filter includes an etalon.

In embodiments, the techniques described herein relate to an inspection system, where the tunable spectral filter includes one or more prisms; and a spatial filter.

In embodiments, the techniques described herein relate to an inspection system, where the tunable spectral filter includes one or more diffraction gratings; and a spatial filter.

In embodiments, the techniques described herein relate to an inspection system, further including a haze mask when operating in at least the first measurement mode, where the haze mask is configured to pass light scattered from one or more particles on the sample and suppress scattered light from a surface of the sample.

In embodiments, the techniques described herein relate to an inspection system, where the haze mask includes a waveplate; and a polarizer.

In embodiments, the techniques described herein relate to an inspection method including generating an illumination beam; directing the illumination beam to a sample; selecting a measurement mode from at least a first measurement mode or a second measurement mode for imaging the sample with an inspection system, where the inspection system includes an imaging sub-system including an objective lens configured to collect sample light from the sample in response to the illumination beam, where the objective lens exhibits chromatic aberration within a spectrum of the illumination beam; and one or more detectors to image the sample based on at least a portion of the sample light collected by the objective lens, where an image pixel size is adjustable, where the image pixel size is a size of pixels of the one or more detectors projected to a plane of the sample, where the inspection system further includes a tunable spectral filter with an adjustable linewidth configured to selectively adjust a spectrum of at least one of the illumination beam or the sample light, where the first measurement mode provides a relatively larger linewidth and a relatively larger image pixel size than the second measurement mode; generating one or more images of the sample using the measurement mode selected from at least the first measurement mode or the second measurement mode; and at least one of identifying or characterizing one or more defects on the sample based on the one or more images.

In embodiments, the techniques described herein relate to an inspection system including a controller communicatively coupled to at least one of an illumination source configured to generate an illumination beam, an illumination sub-system including one or more lenses configured to direct the illumination beam to a sample, an imaging sub-system, or a tunable spectral filter, where the imaging sub-system includes an objective lens configured to collect sample light from the sample in response to the illumination beam, where the objective lens exhibits chromatic aberration within a spectrum of the illumination beam; and one or more detectors to image the sample based on at least a portion of the sample light collected by the objective lens, where an image pixel size is adjustable, where the image pixel size is a size of pixels of the one or more detectors projected to a plane of the sample; where the tunable spectral filter provides an adjustable linewidth configured to selectively adjust a spectrum of at least one of the illumination beam or the sample light, where the imaging sub-system and the tunable spectral filter are configurable according to at least a first measurement mode and a second measurement mode, where the first measurement mode provides a relatively larger linewidth and a relatively larger image pixel size than the second measurement mode; and where the controller includes one or more processors configured to execute program instructions causing the one or more processors to receive one or more images of the sample from at least one of the one or more detectors; and at least one of identify or characterize one or more defects on the sample based on the one or more images.

In embodiments, the techniques described herein relate to an inspection system, where the program instructions are further configured to cause the one or more processors to control at least one of the tunable spectral filter or the imaging sub-system to generate each of the one or more images in a selected measurement mode selected from one or more measurement modes including the first measurement mode and the second measurement mode.

In embodiments, the techniques described herein relate to an inspection system, where the image pixel size is adjustable by controlling a magnification of the imaging sub-system.

In embodiments, the techniques described herein relate to an inspection system, where the first measurement mode provides a relatively higher chromatic aberration by the objective lens than the second measurement mode.

In embodiments, the techniques described herein relate to an inspection system, where the tunable spectral filter adjusts the spectrum of the illumination beam.

In embodiments, the techniques described herein relate to an inspection system, where the tunable spectral filter adjusts the spectrum of the sample light.

In embodiments, the techniques described herein relate to an inspection system, where the spectrum of the illumination beam includes wavelengths in an ultraviolet spectral (UV) range or lower.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
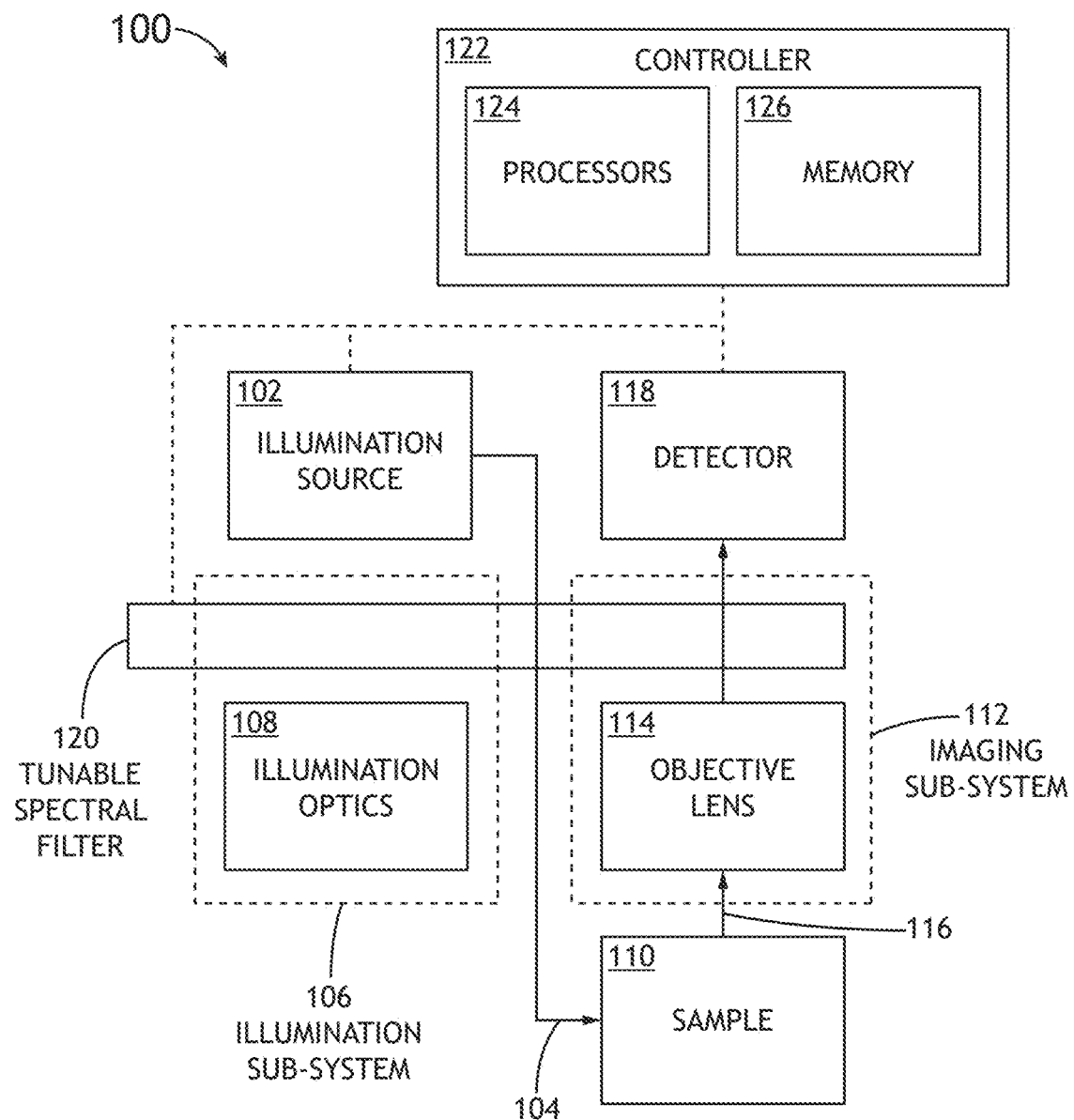
FIG. 1A is a block diagram depicting an inspection system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods providing cost-effective image-based optical inspection using multiple selectable measurement configurations, which are referred to herein as measurement modes. In embodiments, an inspection system includes an illumination source providing a pulsed laser illumination beam with multiple longitudinal modes and a tunable spectral filter that may selectively control a linewidth (and therefore a power) of the illumination beam. For example, the illumination source may include a high-power pulsed laser. The inspection system may further be configurable according to two or more configurations (e.g., measurement modes) providing different combinations of the linewidth and power of the illumination beam, an image pixel size (e.g., a size of pixels of a detector projected to a sample plane), or an imaging magnification. In this way, different optical modes may be tailored for different sample types and/or applications in which different sources of noise dominate.

Embodiments of the present disclosure may provide robust operation using relatively cost-effective components. For example, embodiments of the present disclosure may utilize a high-power pulsed laser, which may be a more cost-effective and/or robust way to achieve high powers than using a CW laser. Embodiments of the present disclosure may further use any objective lens including, but not limited to, an objective lens that is weakly corrected or uncorrected for chromatic aberration over the available linewidth of the illumination beam (e.g., an uncorrected or weakly corrected objective lens that exhibits fully formed or minor residual chromatic aberration). It is contemplated herein that it is significantly more expensive to correct chromatic aberration in a high numerical aperture (NA) lens in a deep ultraviolet (UV) wavelength range than for a visible wavelength range. Notably, the image pixel size may be adjusted in combination with the illumination linewidth based on the relevant noise sources to provide high signal to noise ratios (SNRs) in a wide range of applications or sample types. In embodiments, an inspection system may be configured to operate in at least two measurement configurations, where a first measurement configuration is tailored for situations in which sensor noise is dominant and a second configuration is tailored for situations in which optical noise associated with surface scattering (e.g., surface haze) is dominant. The first configuration may be suitable for samples with low surface haze is either negligible (e.g., for well-polished samples such as semiconductor wafers) or suppressed by the inspection system and is thus referred to herein as a low-haze configuration. In such a low haze configuration, higher laser power and larger image pixel size tends to provide higher SNR. Further, relatively larger image pixel sizes can tolerate more chromatic aberration. As a result, a tunable spectral filter can be wider or fully open to provide maximum power for illumination. The second configuration may be suitable for samples with relatively higher surface haze (e.g., for samples with one or more deposited films). In such a haze-limited configuration (e.g., a high-haze configuration), relatively smaller image pixel sizes improve SNR. However, relatively smaller image pixel sizes provide lower tolerance of spectral line width such that the spectral line width needs to be narrowed (e.g., using a tunable spectral filter) to achieve higher SNR. The loss of laser power due to the narrower spectral filter with smaller image pixel size has much less impact on SNR. The spectral line width can be further optimized for cases in between sensor noise limited cases and haze limited cases.

Referring now to FIGS. 1A-4, systems and methods providing sensitive optical inspection with multiple selectable measurement configurations are described in greater detail, in accordance with one or more embodiments of the present disclosure.

FIG. 1A is a block diagram depicting an inspection system 100, in accordance with one or more embodiments of the present disclosure. In embodiments, the inspection system 100 includes an illumination source 102 to generate an illumination beam 104, and an illumination sub-system 106 including one or more illumination optics 108 to direct the illumination beam 104 to a sample 110. The inspection system 100 may also include an imaging sub-system 112 with at least an objective lens 114 to image the sample 110 with a based on light emanating from the sample 110, which is referred to herein as sample light 116. For example, the imaging sub-system 112 may include one or more detectors 118 to generate images of the sample 110 (e.g., an illuminated portion thereof) based on the sample light 116. In embodiments, the inspection system 100 further includes a tunable spectral filter 120 to control a spectral linewidth associated with a spectrum of light used to generate images of the sample 110 (e.g., an imaging linewidth). For example, the tunable spectral filter 120 may control a linewidth of the illumination beam 104 (e.g., an illumination linewidth) and/or a linewidth of the sample light 116 directed to a detector 118 for imaging. In this way, a tunable spectral filter 120 may be located in an illumination sub-system 106 and/or an imaging sub-system 112 of the inspection system 100.

Figure 1B:
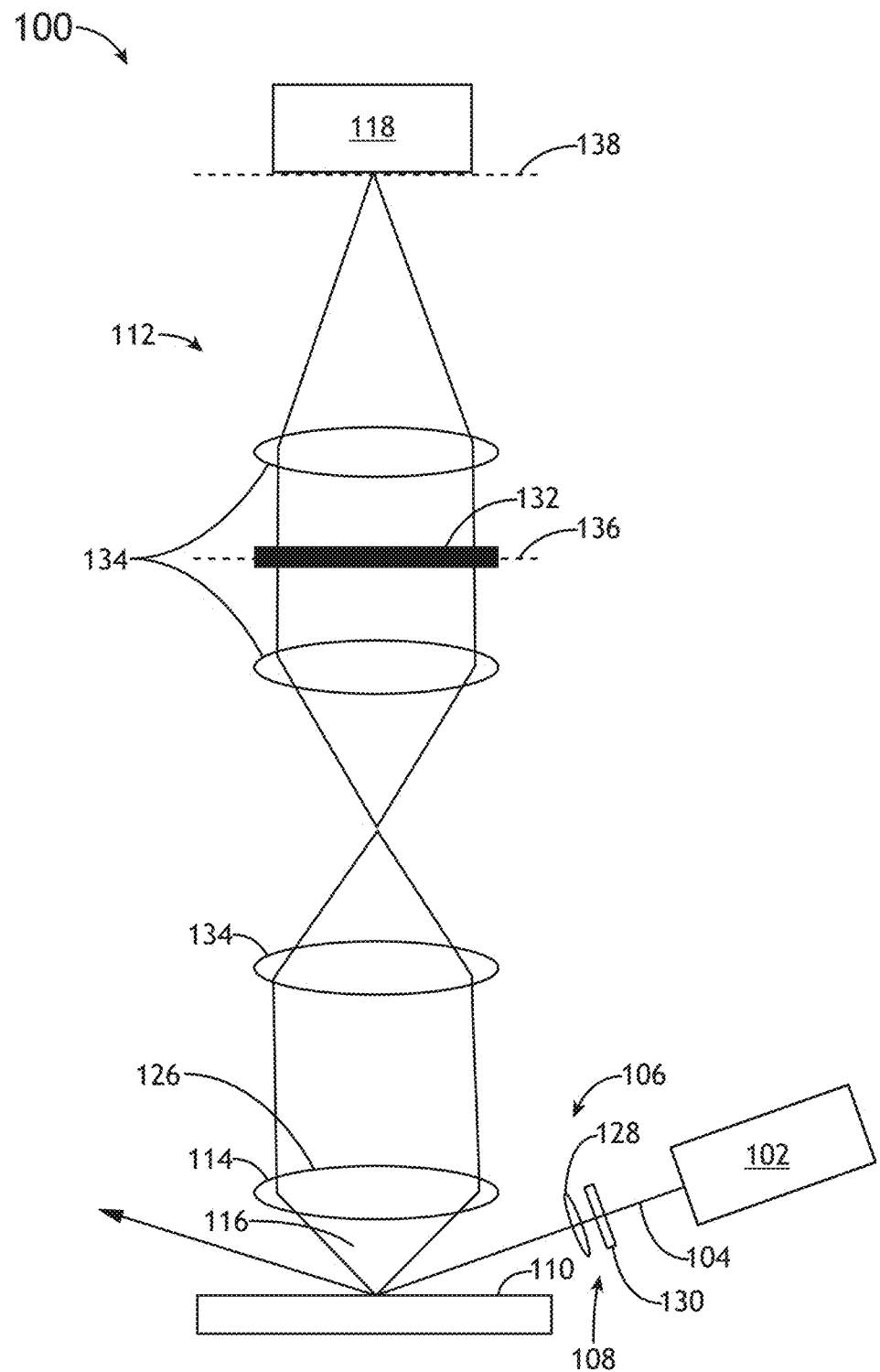
FIG. 1B is a simplified schematic depicting an inspection system, in accordance with one or more embodiments of the present disclosure.

In embodiments, as illustrated in FIG. 1B, the inspection system 100 is a dark-field imaging system configured to exclude specularly-reflected light during imaging. In this regard, the inspection system 100 may image the sample 110 based primarily on scattered or diffracted light. Dark-field imaging may be implemented using any technique known in the art. For example, FIG. 1B illustrates a configuration in which the illumination sub-system 106 includes illumination optics 108 arranged to direct the illumination beam 104 to the sample 110 at an oblique incidence angle that is excluded from a NA of an objective lens 114 used to collect sample light 116 for imaging. In this way, specular reflection of the illumination beam 104 may also be excluded from the NA of the objective lens 114 and not collected. The oblique incidence angle may generally include any selected incidence angle. For example, the incidence angle may be, but is not required to be, greater than 60 degrees with respect to a surface normal. As another example, though not shown, the illumination sub-system 106 may direct the illumination beam 104 to the sample 110 through the objective lens 114 and may further include one or more beam blocks or apertures to prevent specular reflection of the illumination beam 104 from reaching a detector 118. It is noted that the inspection system 100 is not limited to dark-field imaging and may implement bright-field imaging or any other suitable imaging technique. In this way, the inspection system 100 may be configured as any type of imaging system known in the art. Further, the objective lens 114 may have, but is not required to have, a NA of approximately 0.9 or greater. In embodiments, the inspection system 100 may include one or more components to block specular reflection from reaching the detector 118.

In embodiments, the inspection system 100 further includes a controller 122 including one or more processors 124 configured to execute program instructions maintained on a memory 126 (e.g., memory medium). The controller 122 may be communicatively coupled to any components of the inspection system 100 such as, but not limited to, the tunable spectral filter 120 or detectors 118. For example, the controller 122 may receive data from any components of the inspection system 100 and/or direct, via control signals, any components of the inspection system 100 to perform various actions. In this way, the program instructions may cause the processors 124 to implement and/or direct the implementation of any of the process steps within the present disclosure. For example, the controller 122 may control or otherwise direct (e.g., via control signals) components such as, but not limited to, the tunable spectral filter 120 or detectors 118 to generate images of a sample 110 using selected imaging parameters. As another example, the controller 122 may receive, analyze, and/or process images of the sample 110 generated by a detector 118. As another example, the controller 122 may identify and/or characterize defects on the sample 110.

The inspection system 100 identify and/or characterize any type of defects on any type of sample 110, which is broadly referred to herein as inspection. In embodiments, the inspection system 100 can identify and/or characterize defects on samples 110 associated with semiconductor fabrication processes. For example, a sample 110 may include, but is not limited to, an unprocessed (e.g., bare) semiconductor wafer, a semiconductor wafer having one or more films, or a semiconductor wafer having one or more patterned features (e.g., patterned films). In this configuration, defects of interest may include, but are not limited to, particles on the sample 110 or structural damage to the sample 110 in the form of scratches, dents, pits, or the like.

In many applications, defects are smaller than the optical resolution of imaging sub-system 112 such that an image of such defects corresponds to a PSF of the imaging system altered by the electric field distribution of light scattered by the defect and/or the sample 110. In particular, the PSF of the imaging sub-system 112 describes the distribution of light associated with a point object (e.g., an infinitely small object), which is governed by diffraction of light throughout the imaging sub-system 112. Further, the PSF may be defined or otherwise characterized at the plane of the sample 110.

Inspection sensitivity may be based at least in part on a SNR associated with a defect signal measured by pixels of a detector 118 as well as various noise sources. For example, a source of noise may include optical scattering noise associated with scattering of the illumination beam 104 by the sample (e.g., surface haze) and/or air molecules near an imaging field. As another example, a source of noise may include sensor noise such as, but not limited to, dark current noise or readout noise.

It is contemplated herein that noise sources may vary widely for different types of samples 110 and/or applications. For example, surface haze may be substantially lower for well-polished samples 110 (e.g., bare semiconductor wafers, or the like) than for samples 110 with one or more deposited films or other features.

It is further contemplated herein that different techniques may be utilized to improve SNR depending on which source of noise is dominant for a particular application. In embodiments, the inspection system 100 is configurable to operate in two or more different measurement configurations. In this way, the inspection system 100 may be tailored to provide a high SNR in the presence of different dominant noise sources.

Each measurement configuration may correspond to a unique set of parameters of the inspection system 100 such as, but not limited to, a spectral linewidth (e.g., a linewidth of the illumination beam 104 and/or collected sample light 116) or an image pixel size of a detector 118. The image pixel size refers to a size of a pixel of the detector 118 (e.g., a sensor pixel size) projected to a plane of the sample 110, which may correspond to the sensor pixel size divided by the optical magnification of the imaging sub-system 112. In this way, the image pixel size may be determined by the sensor pixel size and the optical magnification of the imaging sub-system 112. It is contemplated herein that limiting the spectral linewidth may reduce the signal strength, but may also limit chromatic aberration by the objective lens 114 or other components. In this way, the spectral linewidth and the image pixel size may be balanced to provide different measurement modes suitable for different imaging and/or sample conditions such as, but not limited to, an amount of surface haze.

Non-limiting examples of measurement configurations of the inspection system 100 are now described in greater detail, in accordance with one or more embodiments of the present disclosure.

In embodiments, the inspection system 100 may be configured to operate in a low-haze configuration (e.g., a first measurement configuration) tailored for applications in which noise associated with surface haze from the sample 110 is sufficiently low that sensor noise is dominant during imaging. For example, surface haze may naturally be low and/or may be effectively suppressed for well-polished samples 110 such that sensor noise may dominate. The suppression of surface haze in defect inspection is described generally in U.S. Pat. No. 10,942,135 issued on Mar. 9, 2021 and U.S. Pat. No. 10,948,423 issued on Mar. 16, 2021, both of which are incorporated herein by reference in their entireties. For example, the inspection system 100 may include a haze mask that passes light scattered from one or more particles (e.g., defects) on the sample 110 and suppresses scattered light from a surface of the sample 110 (e.g., surface haze). The haze mask may suppress the surface haze using any technique including, but not limited to, directing the surface haze along a different optical path than remaining sample light 116 or absorbing the surface haze. As an illustration, a haze mask may include, but is not limited to, one or more polarization rotating optics (e.g., one or more waveplates), and/or one or more polarizers arranged to distinguish surface haze from defect signals.

When sensor noise is dominant, the SNR associated with an imaged defect may scale with increasing illumination power and/or increasing image pixel size relative to the PSF to capture a greater percentage of the signal per pixel. Further, sensor noise may be fixed or known for a particular sensor and associated operating conditions (e.g., temperature, or the like) and is typically not dependent on (or only weakly dependent on) the sensor pixel size.

Beneficially, this configuration may be tolerant to chromatic aberrations from the objective lens 114 or other components associated with the wide spectral linewidth. For example, chromatic aberrations may manifest as an increase of the size and/or decrease of the peak power of the imaged defect (e.g., the PSF). However, the image pixel size may be selected to capture a relatively large portion of the PSF or in some cases all of the PSF even in the presence of chromatic aberration to maintain a high SNR. As a result, an uncorrected or weakly corrected objective lens 114 may be used. Since an uncorrected or weakly corrected objective lens 114 may be substantially less expensive than a corrected objective lens 114, particularly when corrected for UV wavelengths, this may substantially reduce the cost of the inspection system 100.

In embodiments, the inspection system 100 may be configured to operate in a high-haze configuration (e.g., a second measurement configuration) tailored for applications in which noise associated with surface haze from the sample 110 dominates sensor noise. This may be the case for samples including deposited films or other features.

When noise associated with surface haze is dominant, the SNR regime may not scale (or may scale only weakly) with increasing illumination power since both the signal and the noise depend on the illumination power. Instead, the SNR may be improved by decreasing the image pixel size (or decreasing magnification of the imaging sub-system 112) since optical noise associated with surface haze may be distributed across an image plane and smaller image pixel size captures less of this noise per pixel. It is understood that this scaling may plateau when the pixel size becomes much smaller than the PSF. It may also be desirable to provide a diffraction-limited PSF (or more generally to provide relatively small PSF with a high peak) to improve the signal strength captured by the smaller pixels. For example, the PSF may be improved by limiting the spectral linewidth (e.g., with the tunable spectral filter 120) to reduce chromatic aberration by the objective lens 114 or other components. As an illustration, the tunable spectral filter 120 may limit the PSF to be diffraction-limited (e.g., limited by diffraction in the imaging sub-system 112). As another illustration, the tunable spectral filter 120 may limit the PSF to be smaller than or equal to the image pixel size.

It is contemplated herein that the low-haze and high-haze configurations described herein do not require particular values of the various parameters of the inspection system 100 but may rather provide relative changes of these parameters. For example, a high-haze configuration may provide smaller image pixel size and/or higher magnification than a low-haze configuration. As another example, a high-haze configuration may provide a relatively lower spectral linewidth than a low-haze configuration.

Further, the descriptions of the low-haze configuration and the high-haze configuration are provided solely for illustrative purposes and should not be interpreted as limiting on the scope of the present disclosure. Rather, the inspection system 100 may be configured to operate in any number of measurement configurations with any combination of parameters.

Referring now to FIGS. 1B-1G, the implementation of multiple measurement modes in optical inspection is described in greater detail, in accordance with one or more embodiments of the present disclosure. In particular, FIG. 1B depicts an inspection system 100 generally, whereas FIGS. 1C-1G, depict various non-limiting configurations of an inspection system 100 providing multiple measurement modes.

FIG. 1B is a simplified schematic depicting an inspection system 100, in accordance with one or more embodiments of the present disclosure.

As described with respect to FIG. 1A, the inspection system 100 may include an illumination source 102 configured to generate an illumination beam 104, an illumination sub-system 106 with illumination optics 108 configured to direct the illumination beam 104 to the sample 110, and an imaging sub-system 112 with at least an objective lens 114 to collect sample light 116 and generate an image of the sample 110 on one or more detectors 118.

The illumination beam 104 may include one or more selected wavelengths of light including, but not limited to, ultraviolet (UV) radiation, visible radiation, or infrared (IR) radiation. For example, the illumination source 102 may provide, but is not required to provide, an illumination beam 104 having wavelengths shorter than approximately 350 nm. By way of another example, the illumination beam 104 may provide a wavelength of approximately 266 nm. By way of another example, the illumination beam 104 may provide a wavelength of approximately 213 nm. By way of another example, the illumination beam 104 may provide a wavelength of approximately 193 nm. It is recognized herein that imaging resolution and light scattering by small particles (e.g., relative to the wavelength of the illumination beam 104) both generally scale inversely with wavelength such that decreasing the wavelength of the illumination beam 104 may generally increase the imaging resolution and scattering signal from the small particles. Accordingly, illumination beam 104 may include short-wavelength light including, but not limited to, extreme ultraviolet (EUV) light, deep ultraviolet (DUV) light, or vacuum ultraviolet (VUV) light.

The illumination beam 104 may further have any temporal profile. For example, the illumination beam 104 may have a continuous temporal profile, a modulated temporal profile, a pulsed temporal profile, or the like.

The illumination source 102 may include any type of light source known in the art. In embodiments, the illumination source 102 is pulsed laser source (e.g., a high-power pulsed laser) providing an illumination beam 104 with multiple longitudinal modes. For example, the illumination source 102 may include, but is not required to include, a high-power pulsed laser providing power in a range of 1-100 W. In the case of a pulsed laser illumination source 102, a linewidth of the illumination beam 104 (sample light 116 associated with the illumination beam 104) may be tuned with the tunable spectral filter 120. For example, the linewidth of the illumination beam 104 may be greater than approximately one picometer. As another example, the linewidth of the illumination beam 104 may be greater than approximately 10 picometers. For example, the linewidth of the illumination beam 104 may be greater than approximately one nanometer. As another example, the linewidth of the illumination beam 104 may be sufficiently large to induce chromatic dispersion in a selected objective lens 114 used to collect sample light 116. As an illustration, it may be desirable to use an objective lens 114 that is either uncorrected for or only weakly corrected for chromatic aberration for wavelengths associated with the illumination beam 104. Such an objective lens 114 may reduce cost relative to a better-corrected version. In this case, the chromatic aberration may manifest as a degradation of a PSF at a detector 118 when a full linewidth of the illumination beam 104 is used such as, but not limited to, a decrease of peak amplitude of the PSF beyond a tolerance or an increase of a size of the PSF beyond a tolerance. As described throughout the present disclosure, a tunable spectral filter 120 may control an effective linewidth of light used for imaging (e.g., control a linewidth of the illumination beam 104 and/or the sample light 116 reaching a detector 118) and thus control the amount of degradation of the PSF due to chromatic aberration. In this way, different measurement modes may utilize different linewidths of light for imaging.

The illumination optics 108 in the illumination sub-system 106 may include any number of components to direct or otherwise manipulate the illumination beam 104. For example, the illumination optics 108 may include one or more illumination lenses 128 to focus and/or relay the illumination beam 104. The illumination lenses 128 may further provide any number of relayed illumination pupil planes and/or illumination field planes. As another example, the illumination optics 108 may include one or more illumination beam-controlling optics 130 such as, but not limited to apodizers, polarizers, spectral filters, neutral density filters, or homogenizers. Further, the illumination beam-controlling optics 130 may be located at any suitable location such as, but not limited to, an illumination pupil plane or an illumination field plane.

It is recognized herein that the strength of surface haze may depend on multiple factors including, but not limited to incidence angle or polarization of the illumination beam 104. For example, the strength of surface haze may be relatively high for near-normal angles of incidence and may drop off for higher incidence angles. In embodiments, the illumination sub-system 106 directs (e.g., via the illumination lenses 128 or other suitable elements), the illumination beam 104 to the sample 110 at an oblique incidence angle to increase a defect signal (e.g. a strength of sample light 116 associated with a defect on the sample 110). The oblique incidence angle may generally include any selected incidence angle. For example, the incidence angle may be, but is not required to be, greater than 60 degrees with respect to a surface normal of the sample 110. However, this is not a limitation and the illumination beam 104 may be directed to the sample 110 at any incidence angle.

The imaging sub-system 112 may include an objective lens 114 to collect sample light 116 from the sample 110 in response to illumination with the illumination beam 104 and may further include any number of generating one or more images of the sample 110 with at least a portion of the sample light 116.

The imaging sub-system 112 may include any number of imaging beam-conditioning optics 132 to direct and/or modify the sample light 116 including, but not limited to, one or more lenses, one or more filters, one or more apertures, one or more polarizers, or one or more phase plates.

The imaging sub-system 112 may include any number of lenses 134 to manipulate the sample light 116 collected by the objective lens 114. For example, the lenses 134 may operate with the objective lens 114 to generate an image of the sample 110 on a detector 118. As another example, the lenses 134 may relay one or more planes (e.g., relay one or more pupil planes 136 and/or field planes 138), which may allow for further manipulation of the sample light 116 with the imaging beam-conditioning optics 132.

In one embodiment, as illustrated in FIG. 1B, the imaging sub-system 112 includes one or more imaging beam-conditioning optics 132 located at or near a pupil plane 136. For example, the imaging sub-system 112 may include imaging beam-conditioning optics 132 configured to suppress surface haze from reaching a detector 118 such as, but not limited to, a haze-rejection polarizer (e.g., a radial polarizer, or the like) or a phase mask at or near a pupil plane 136. In this regard, the inspection system 100 may control and adjust selected aspects of the sample light 116 used to generate an image on the detector 118 including, but not limited to, the intensity, phase, and polarization of the sample light 116 as a function of scattering angle and/or position on the sample 110.

In embodiments, as illustrated in FIG. 1B, the imaging sub-system 112 includes one or more imaging beam-conditioning optics 132 located at or near a pupil plane 136. For example, the imaging sub-system 112 may include imaging beam-conditioning optics 132 such as, but not limited to, a haze mask configured to suppress surface haze from the sample 110. As an illustration, a haze mask may include components such as, but not limited to, polarization-manipulation optics (e.g., polarization rotator, waveplates, polarizers or the like) or phase masks. As another example, the imaging sub-system 112 may include one or more apertures or beam blockers to prevent specular reflection or other unwanted light from reaching a detector 118. In a general sense, imaging beam-conditioning optics 132 may be used to manipulate any combination of the intensity, phase, or polarization of the sample light 116.

However, it is recognized herein that a limited number of imaging beam-conditioning optics 132 may be placed at a particular pupil plane 136 or sufficiently near a particular pupil plane 136 to provide a desired effect. Accordingly, for the purposes of the present disclosure, reference to one or more elements at a pupil plane 136 may generally describe one or more elements at or sufficiently close to a pupil plane 136 to produce a desired effect. In some embodiments, though not shown, the imaging sub-system 112 may include additional lenses to generate one or more additional pupil planes 136 such that any number of imaging beam-conditioning optics 132 may be placed at or near a pupil plane 136.

A detector 118 may include any type of sensor known in the art suitable for measuring illumination received from the sample 110. For example, a detector 118 may include a multi-pixel detector suitable for capturing an image of the sample 110 such as, but not limited to, a charge-coupled device (CCD) detector, a complementary metal-oxide-semiconductor (CMOS) detector, a time-delayed integration (TDI) detector, a photomultiplier tube (PMT) array, an avalanche photodiode (APD) array, or the like. In embodiments, a detector 118 includes a spectroscopic detector suitable for identifying wavelengths of the sample light 116.

The imaging sub-system 112 may generally include any number of detector 118.

Figure 1C:
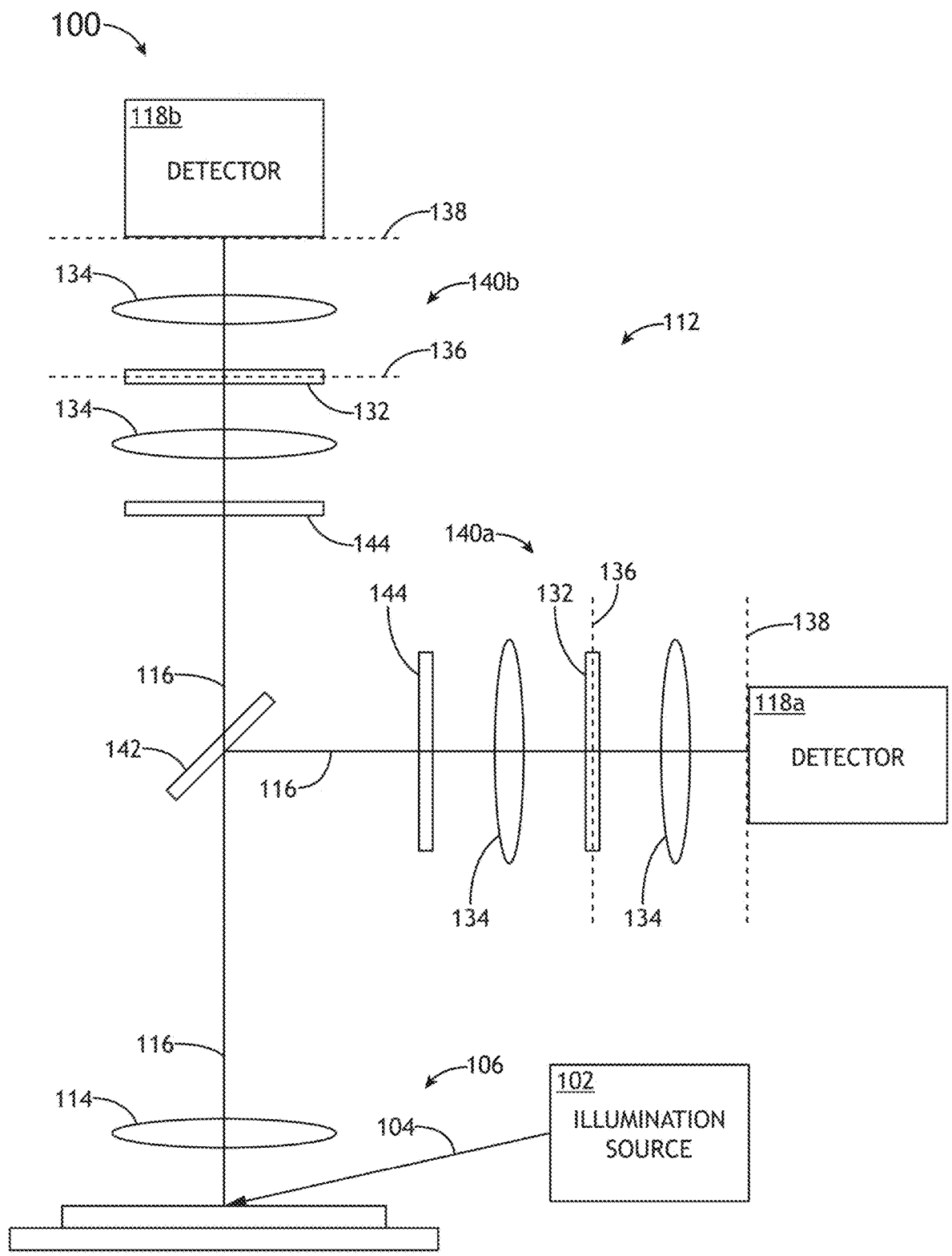
FIG. 1C is a simplified schematic depicting an inspection system with multiple detectors in different collection paths, in accordance with one or more embodiments of the present disclosure.

FIG. 1C is a simplified schematic depicting an inspection system 100 with multiple detectors 118a,b in different collection paths 140a,b, in accordance with one or more embodiments of the present disclosure. For example, the imaging sub-system 112 may include one or more beamsplitters 142 to split the sample light 116 collected by the objective lens 114 into any number of collection paths 140 (e.g., the collection paths 140a,b here). The imaging sub-system 112 may then include one or more detectors 118 within each collection path 140. Any or all of the collection paths 140 may further include any combination of components suitable for imaging the sample 110 such as, but not limited to, imaging beam-conditioning optics 132 or lenses 134.

The imaging sub-system 112 may further include any component or combination of components suitable for selectively directing the sample light 116 collected by the objective lens 114 to a selected collection path 140 such as, but not limited to, one or more shutters or one or more polarization-controlling optics (e.g., polarization rotators, polarizing beamsplitters, or the like). For example, FIG. 1C depicts a non-limiting configuration including shutters 144 in the collection paths 140, which may be coupled to the controller 122 for automated control (e.g., via control signals) or may be manually operated (e.g., by a user).

Such a configuration may be also suitable for polarization-based haze-suppression techniques in which one sub-path provides an image of the sample 110 with suppressed surface haze and another sub-path provides an image of the surface haze. For instance, such a configuration may be suitable for, but is not limited to, implementing polarization-based haze-suppression techniques described in U.S. Pat. Nos. 10,942,135 and 10,948,423 referenced above and incorporated herein by reference in their entireties. For example, the surface haze may be at least substantially directed along one path to a first detector 118a, while the remaining sample light 116 (e.g., primarily including light associated with defects) may be directed to a second detector 118b.

As another example, though not shown, a collection path 140 may include one or more additional beamsplitters to split sample light 116 along additional sub-paths to multiple detectors 118.

As another example, the inspection system 100 may include different detectors 118 having different sensor pixel sizes. For example, the first detector 118a and the second detector 118b may have different sensor pixel sizes, which may provide different available image pixel sizes.

In embodiments, the inspection system 100 includes at least one tunable spectral filter 120 to selectively control a linewidth of light used to image a sample 110. A tunable spectral filter 120 may be located at any location of the inspection system 100 including, but not limited to, within the illumination source 102, within the illumination sub-system 106, or within the imaging sub-system 112.

Referring now to FIGS. 1B-1G, various non-limiting configurations of an inspection system 100 providing multiple measurement modes are shown, in accordance with one or more embodiments of the present disclosure.

As described previously herein, a measurement mode of an inspection system 100 may include a unique combination of linewidth of light used for imaging and an image pixel size. Put another way, a measurement mode of an inspection system 100 may include a unique combination of linewidth of light used for imaging (e.g., a spectral linewidth) and an image pixel size. Put another way, a measurement mode may include a unique combination of linewidth of light used for imaging and a relationship between image pixel size and PSF size (e.g., a size of a diffraction-limited defect).

The spectral linewidth and/or the image pixel size may be adjusted or otherwise controlled using any technique known in the art.

For example, the image pixel size may be adjusted by controlling an optical magnification of the imaging sub-system 112. As an illustration, the imaging sub-system 112 may include one or more zoom lenses and/or lenses with adjustable positions suitable for adjusting the imaging magnification. For instance, any of the lenses 134 in FIG. 1B or 1C may be implemented as zoom lenses and/or lenses with adjustable positions such that the image pixel size may be adjusted or otherwise controlled. As another example, the imaging sub-system 112 may include multiple detectors 118 having different pixel sizes that may be selectively used for imaging. In this way, different measurement modes may selectively utilize different detectors 118 to achieve different pixel sizes. Any suitable technique may be used to select between multiple available detectors 118 when imaging in a particular measurement mode.

As another example, the spectral linewidth may be adjusted by a tunable spectral filter 120 placed at any location suitable for adjusting a linewidth of the illumination beam 104 and/or the sample light 116. FIGS. 1D-1G depict a tunable spectral filter 120 within various non-limiting locations of an inspection system 100. FIGS. 1D-1G depict a configuration of the inspection system 100 shown in FIG. 1C. However, this is merely illustrative and should not be interpreted as limiting the scope of the present disclosure. Rather, a tunable spectral filter 120 may be included in any suitable location within any configuration of an inspection system 100 including, but not limited to, the configuration depicted in FIG. 1B.

Figure 1D:
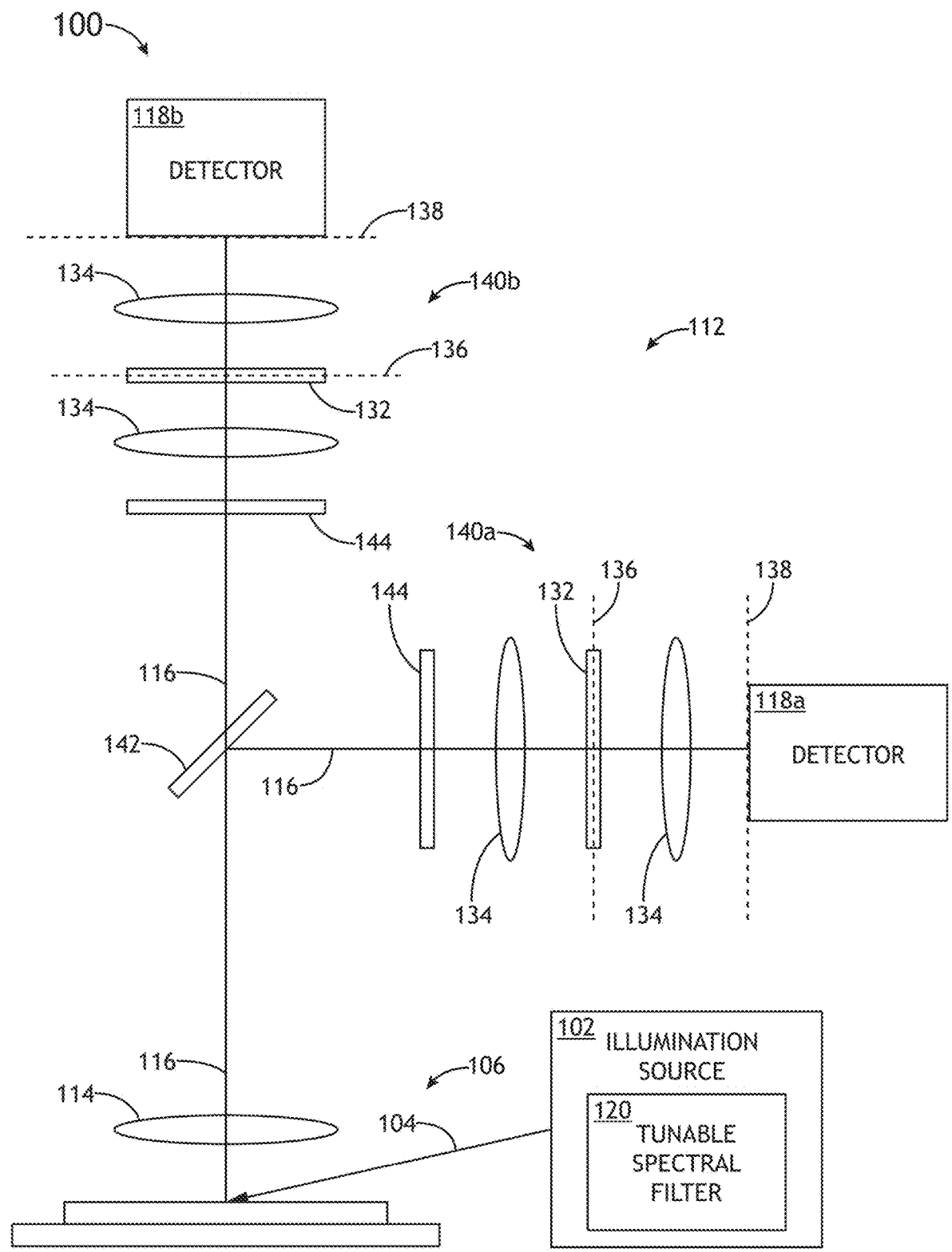
FIG. 1D is a simplified schematic depicting an inspection system with a tunable spectral filter within the illumination source, in accordance with one or more embodiments of the present disclosure.

FIG. 1D is a simplified schematic depicting an inspection system 100 with a tunable spectral filter 120 within the illumination source 102, in accordance with one or more embodiments of the present disclosure. In this configuration, the tunable spectral filter 120 may directly control a spectrum of the illumination beam 104.

Figure 1E:
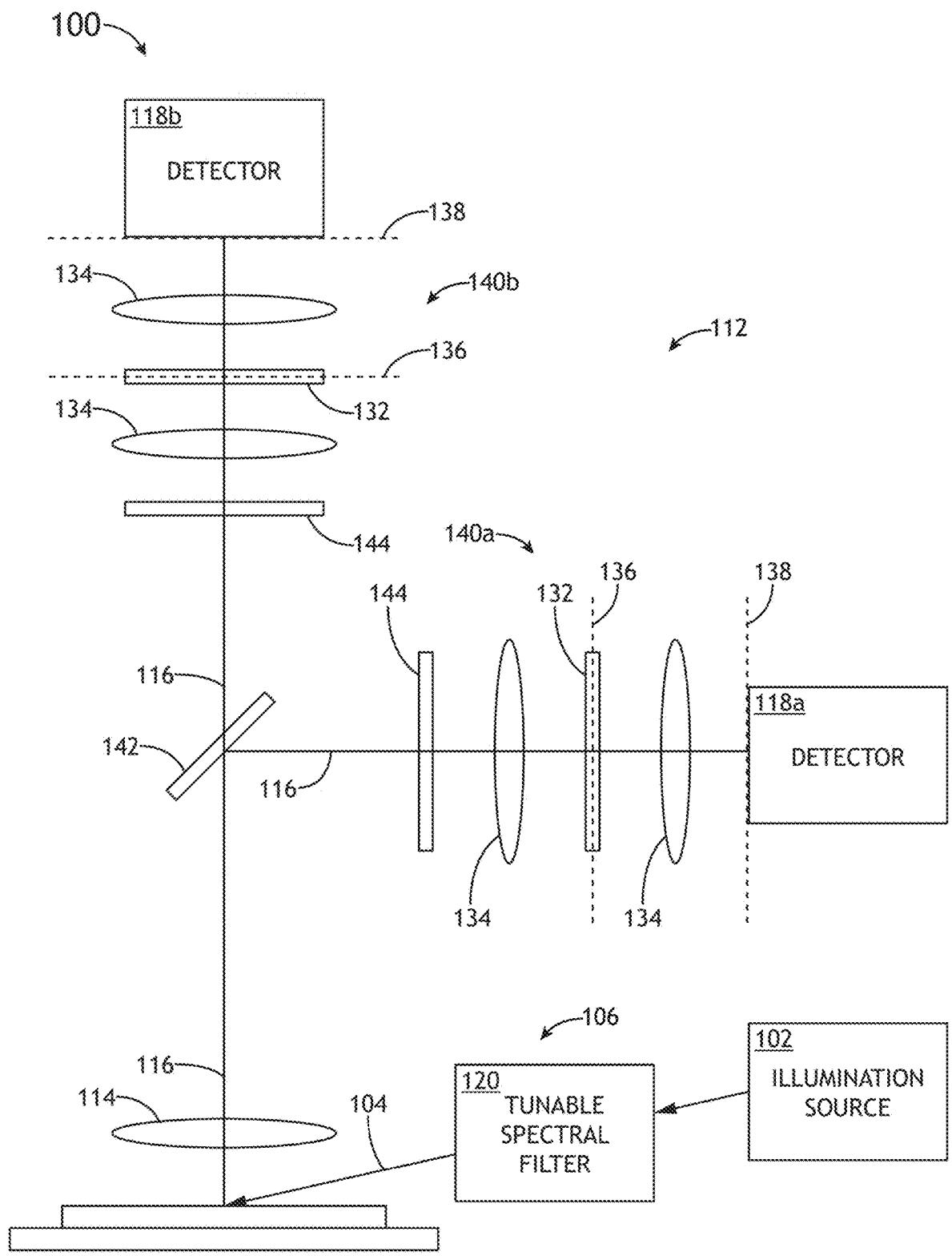
FIG. 1E is a simplified schematic depicting an inspection system with a tunable spectral filter within an illumination sub-system, in accordance with one or more embodiments of the present disclosure.

FIG. 1E is a simplified schematic depicting an inspection system 100 with a tunable spectral filter 120 within an illumination sub-system 106, in accordance with one or more embodiments of the present disclosure. In this configuration, the tunable spectral filter 120 may pass any selected portion of the spectrum of the illumination beam 104.

Figure 1F:
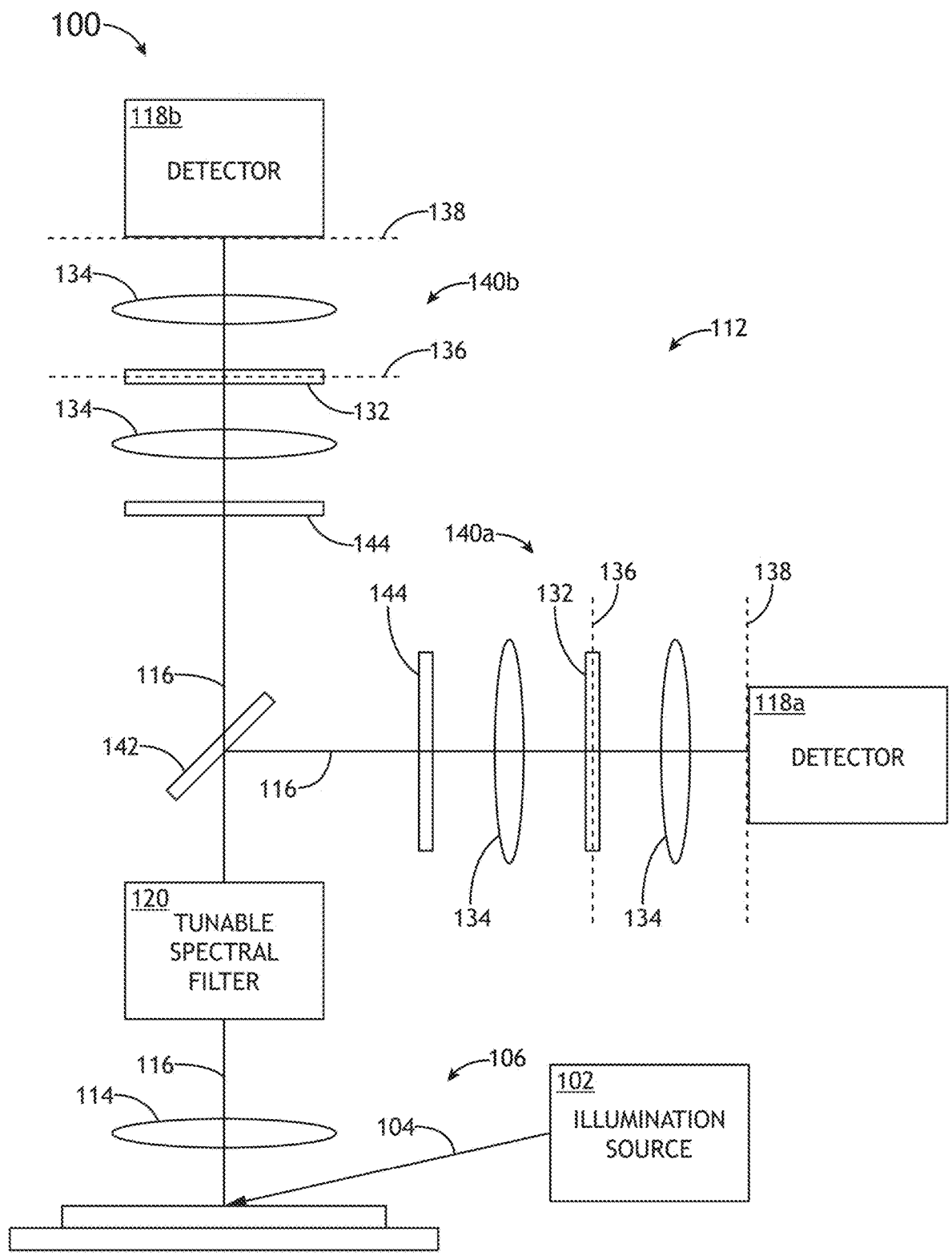
FIG. 1F is a simplified schematic depicting an inspection system with a tunable spectral filter within a portion of an imaging sub-system common to one or more detectors, in accordance with one or more embodiments of the present disclosure.

FIG. 1F is a simplified schematic depicting an inspection system 100 with a tunable spectral filter 120 within a portion of an imaging sub-system 112 common to one or more detectors 118, in accordance with one or more embodiments of the present disclosure. In this configuration, the tunable spectral filter 120 may pass any selected portion of the spectrum of the sample light 116 collected by the objective lens 114.

Figure 1G:
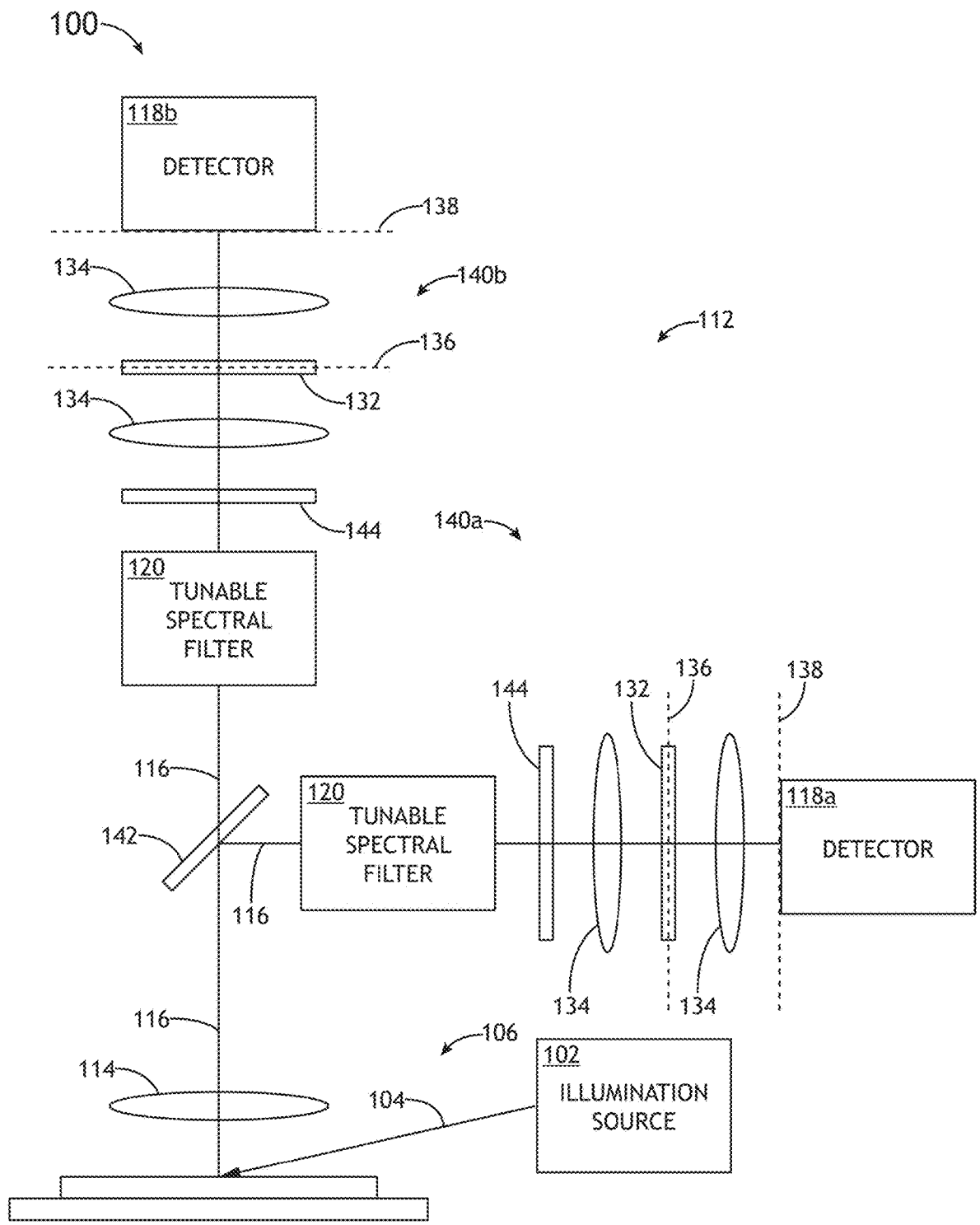
FIG. 1G is a simplified schematic depicting an inspection system with multiple tunable spectral filters in different collection paths of an imaging sub-system, in accordance with one or more embodiments of the present disclosure.

FIG. 1G is a simplified schematic depicting an inspection system 100 with multiple tunable spectral filters 120 in different collection paths 140 of an imaging sub-system 112, in accordance with one or more embodiments of the present disclosure. In this configuration, any particular tunable spectral filter 120 may pass a selected portion of the spectrum of sample light 116 within the associated collection path 140. In this way, the spectrum of the sample light 116 used to generate an image of the sample 110 may be tailored for each detector 118. For instance, the spectrum of the sample light 116 used to generate an image of the sample 110 may be tailored to provide a selected size of a PSF relative to the image pixel size.

Referring now to FIGS. 2A-3C, various designs of a tunable spectral filter 120 are described, in accordance with one or more embodiments of the present disclosure. A tunable spectral filter 120 may generally have any component or combination of components suitable for passing a selected spectrum of light. Put another way, a tunable spectral filter 120 may generally have any component or combination of components suitable for limiting a spectrum of light.

In FIGS. 2A-3C, the tunable spectral filter 120 accepts input light 202 and passes filtered light 204, where a linewidth of the filtered light 204 is equal to or smaller than a linewidth of the input light 202. As described previously herein, the tunable spectral filter 120 may operate on the illumination beam 104 or sample light 116. In this way, the input light 202 may correspond to the illumination beam 104 or the sample light 116 depending on the location of the tunable spectral filter 120 within the inspection system 100.

A tunable spectral filter 120 may operate in a transmission mode or a reflection mode to respectively transmit or reflect passed spectral components. For example, the filtered light 204 may correspond to light transmitted by one or more components of the tunable spectral filter 120 in a transmission mode. As another example, the filtered light 204 may correspond to light reflected by one or more components of the tunable spectral filter 120 in a reflection mode.

Figure 2A:
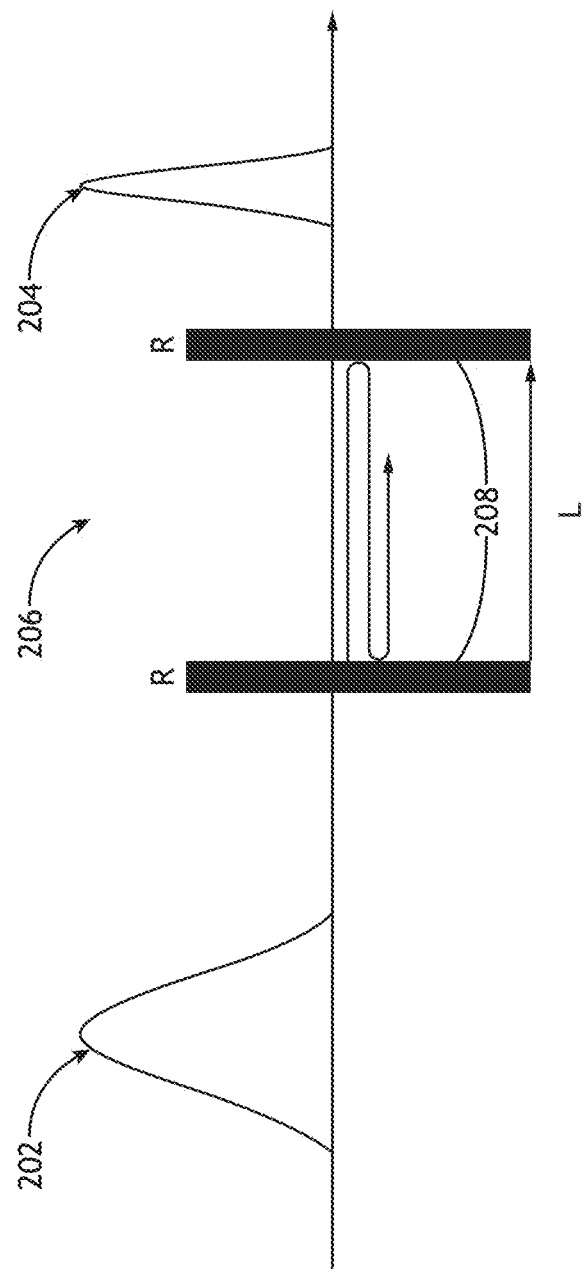
FIG. 2A is a simplified schematic of a tunable spectral filter formed as an etalon, in accordance with one or more embodiments of the present disclosure.

FIG. 2A is a simplified schematic of a tunable spectral filter 120 formed as an etalon 206, in accordance with one or more embodiments of the present disclosure. In embodiments, the tunable spectral filter 120 includes an etalon 206 to provide spectral filtering through optical resonance. For example, an etalon 206 may include two parallel reflective surfaces 208 forming an optical cavity, where the spectral width and transmissivity through the etalon 206 may be controlled by the reflectivity of the reflective surfaces 208. The etalon 206 may be formed using any suitable technique. For example, the reflective surfaces 208 may be formed as two mirrors. As another example, the reflective surfaces 208 may be formed as faces of a solid material.

Figure 2B:
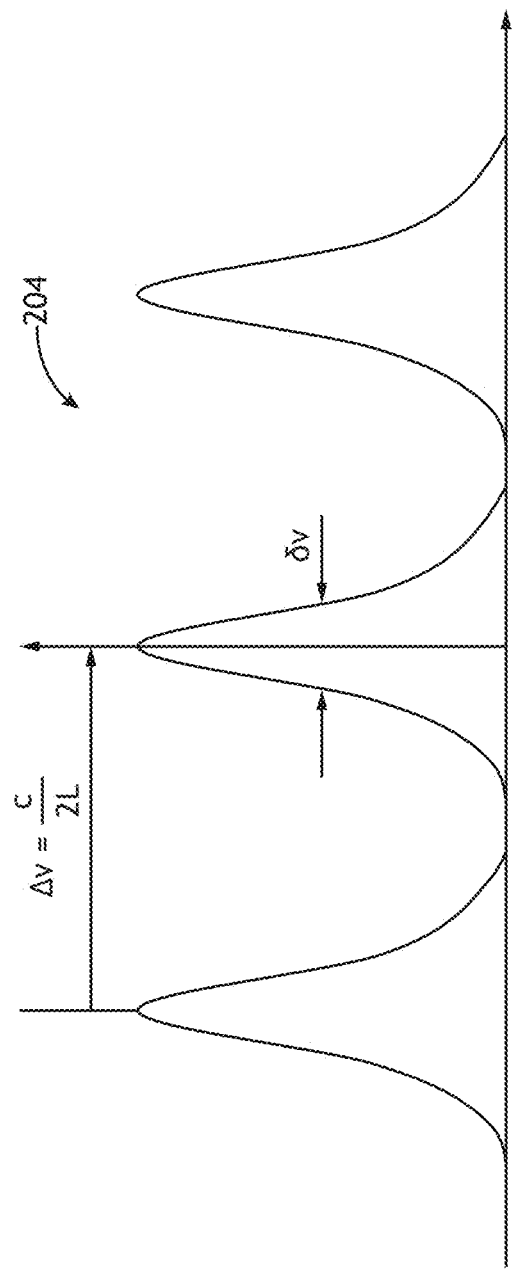
FIG. 2B is a schematic diagram depicting spectral modes transmitted by an etalon, in accordance with one or more embodiments of the present disclosure.

FIG. 2B is a schematic diagram depicting spectral modes transmitted by an etalon 206, in accordance with one or more embodiments of the present disclosure. For example, optical resonance within an etalon 206 may limit transmission to distinct frequencies separated by $$\Delta v = c/2L \quad (1)$$

(e.g., a free spectral range), where c is the speed of light and L is the separation distance between the reflective surfaces 208. Further, the line width (LW) of transmitted light may be represented as $\delta v$. Analytically, an etalon 206 may be characterized by a finesse $$F = \pi\sqrt{R}/1-R, \quad (2)$$

which relates to a quality factor of the resonator. The spectral width may then be written as $$\delta v = \Delta v/F. \quad (3)$$

The transmissivity may be written as $$T = 1/1 + F \cdot \sin^{2\delta/2}, \delta = 4\pi/\lambda nL, F = 4R/(1-R)^2, F = \pi F/2, \quad (4)$$

where n is a refractive index outside the reflective surfaces 208.

Numerically, the spectral properties of a pulse propagating through an etalon 206 may be described as:

$$E_i(t,v) = e(t-t_0)^2/\tau^2 e^{2\pi v t}, \quad (5)$$

$$E_t(t,v) = (1-R)\Sigma_{n=1}^{\infty} R^{n-1} E_i(t-n\Delta t)e^{i(n-1)\delta\phi}, \quad (6)$$

where $$\Delta t = 2L/c, \delta\phi = 4\pi L/\lambda. \quad (7)$$

where $E_i$ and $E_t$ correspond to amplitudes of pulses of input light 202 and filtered light 204 (e.g., transmitted light), respectively.

Figure 2C:
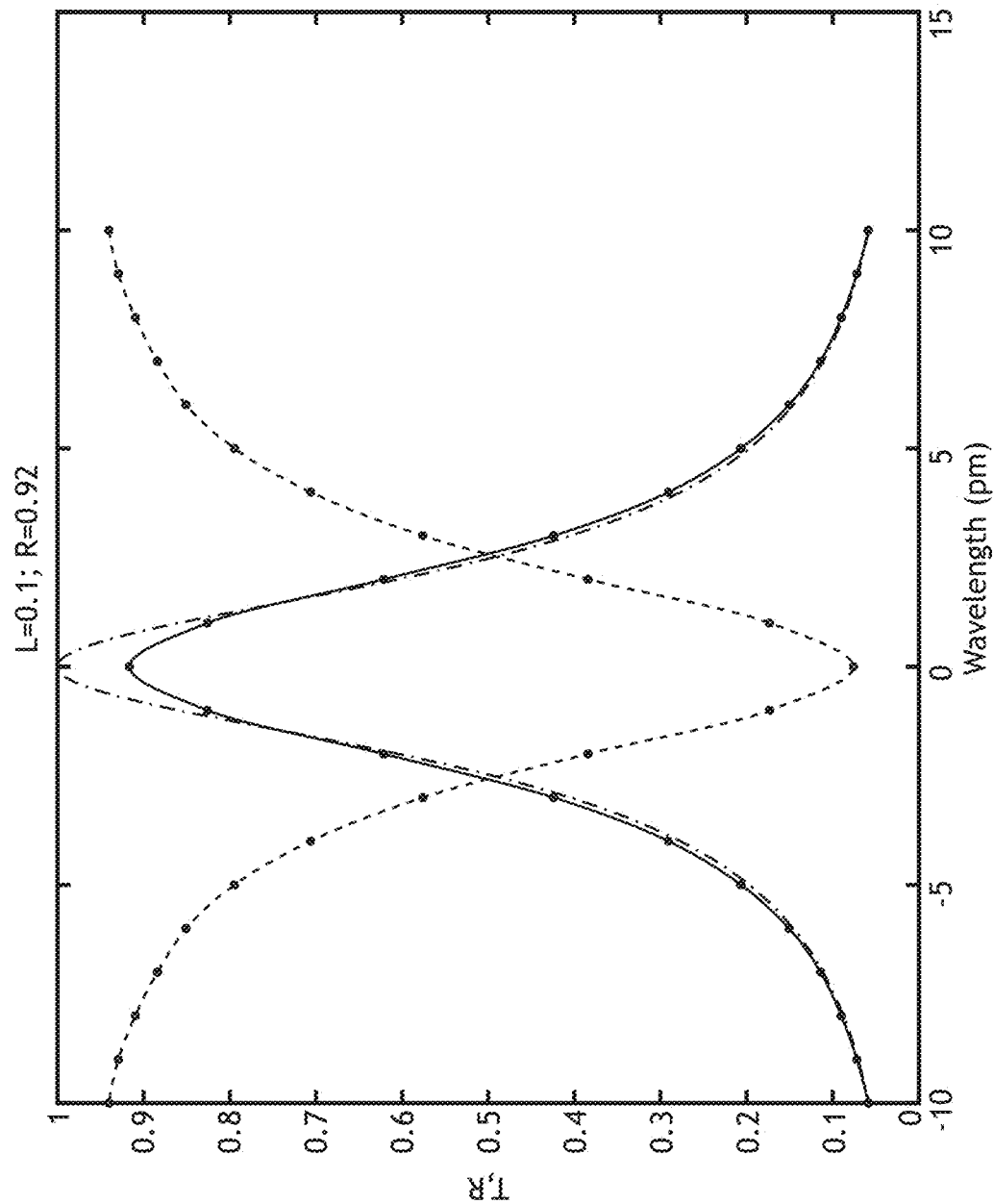
FIG. 2C is a plot of spectral transmission and reflection by an etalon with length of 0.1 mm and reflective surfaces with a reflectivity of 0.92, in accordance with one or more embodiments of the present disclosure.
Figure 2D:
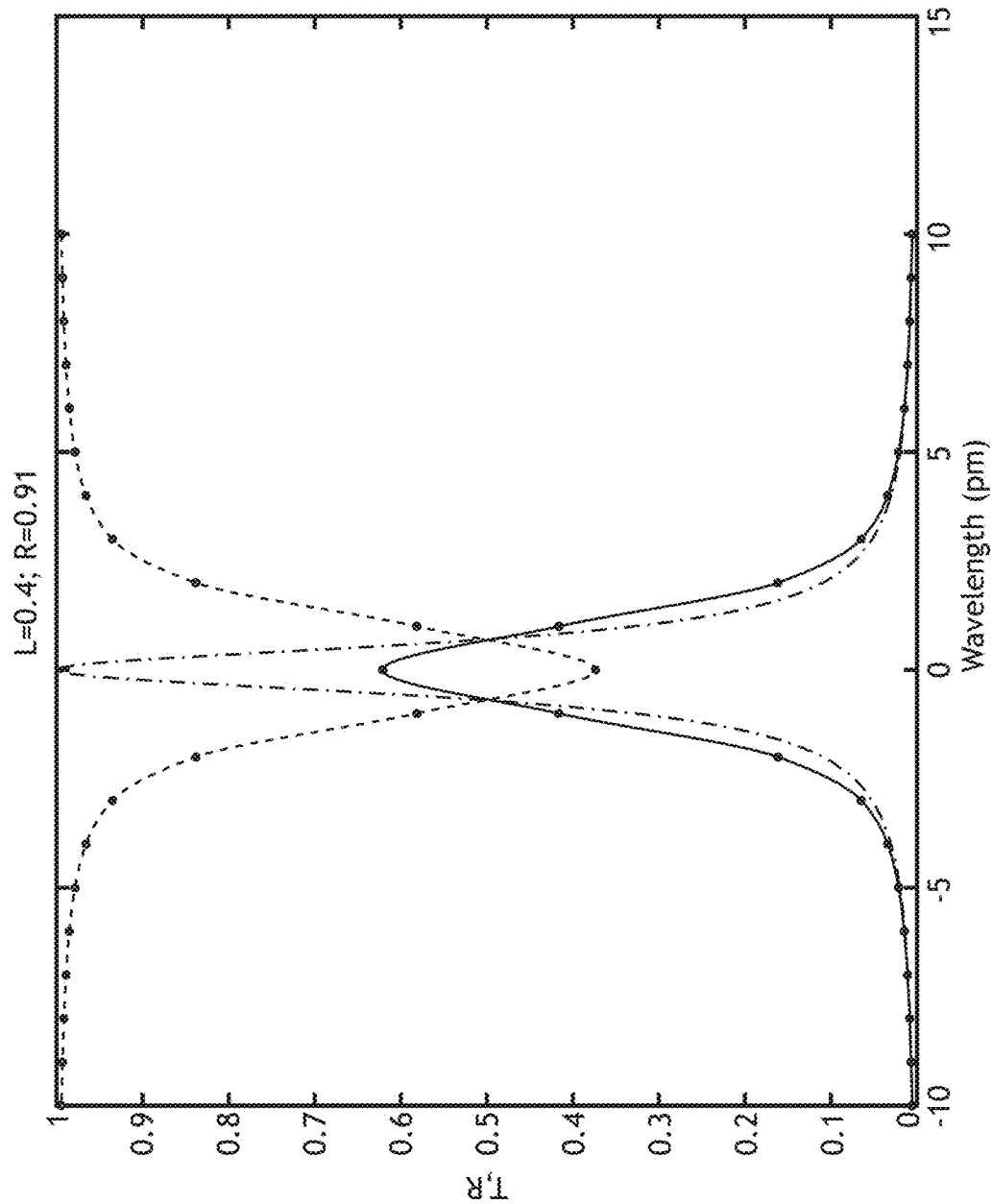
FIG. 2D is a plot of spectral transmission and reflection by an etalon with length of 0.4 mm and reflective surfaces with a reflectivity of 0.91, in accordance with one or more embodiments of the present disclosure.

FIGS. 2C-2D depict spectral filtering properties of an etalon 206 under various conditions, in accordance with one or more embodiments of the present disclosure. FIG. 2C is a plot of spectral transmission and reflection by an etalon 206 with length L of 0.1 mm and reflective surfaces 208 with a reflectivity R of 0.92, in accordance with one or more embodiments of the present disclosure. FIG. 2D is a plot of spectral transmission and reflection by an etalon 206 with length L of 0.4 mm and reflective surfaces 208 with a reflectivity R of 0.91, in accordance with one or more embodiments of the present disclosure. In both FIGS. 2C and 2D, numerical values of the transmissivity and reflectivity of filtered light 204 are provided based on equations (5)-(7) (e.g., based on pulsed input light 202) as well as analytical values of transmissivity of filtered light 204 are provided based on equations (1)-(4) (e.g., based on CW input light 202). As depicted in FIGS. 2C-2D, the use of pulsed input light 202 (e.g., from a mode-locked illumination source 102) may result in lower peak transmission through an etalon 206 and greater spectral linewidth.

Figure 2E:
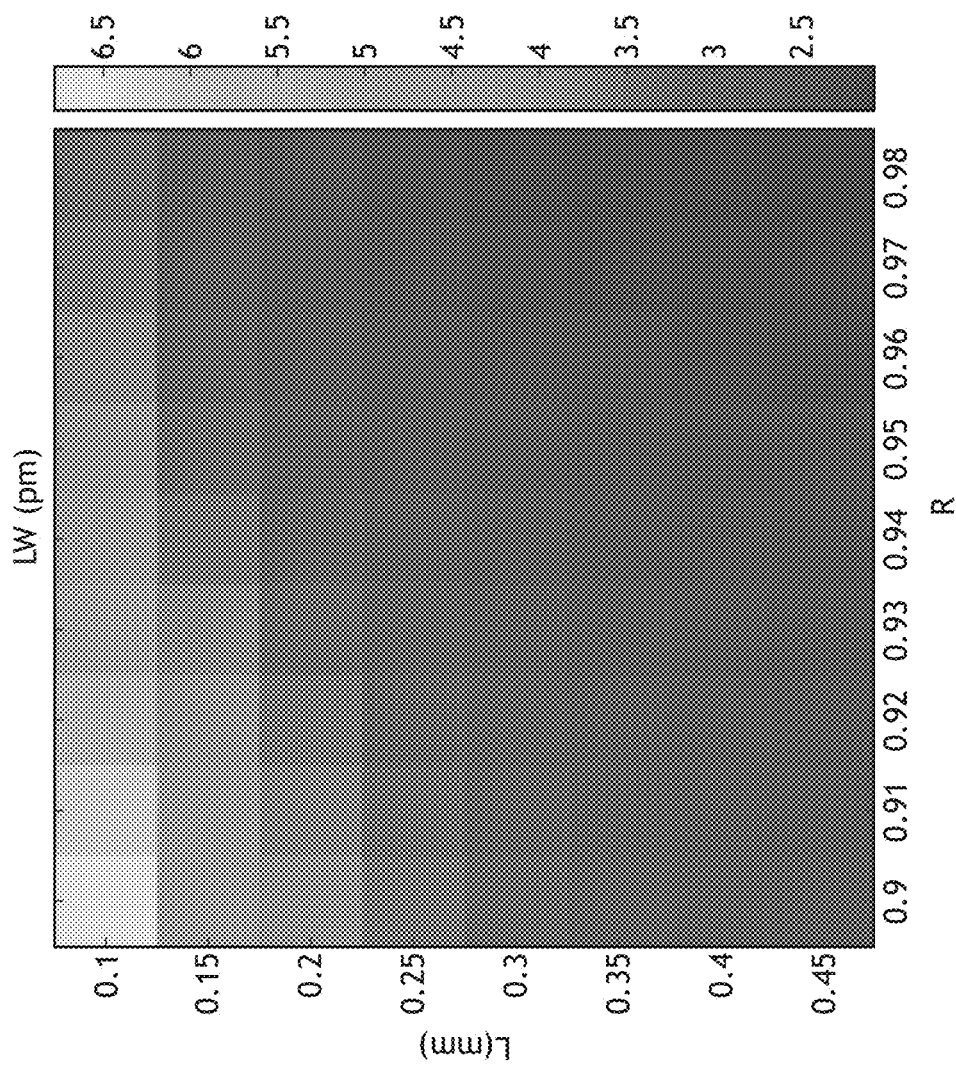
FIG. 2E is a plot of linewidth (LW) of an etalon as a function of the reflectivity of the reflective surfaces as well as the separation between the reflective surfaces, in accordance with one or more embodiments of the present disclosure.
Figure 2F:
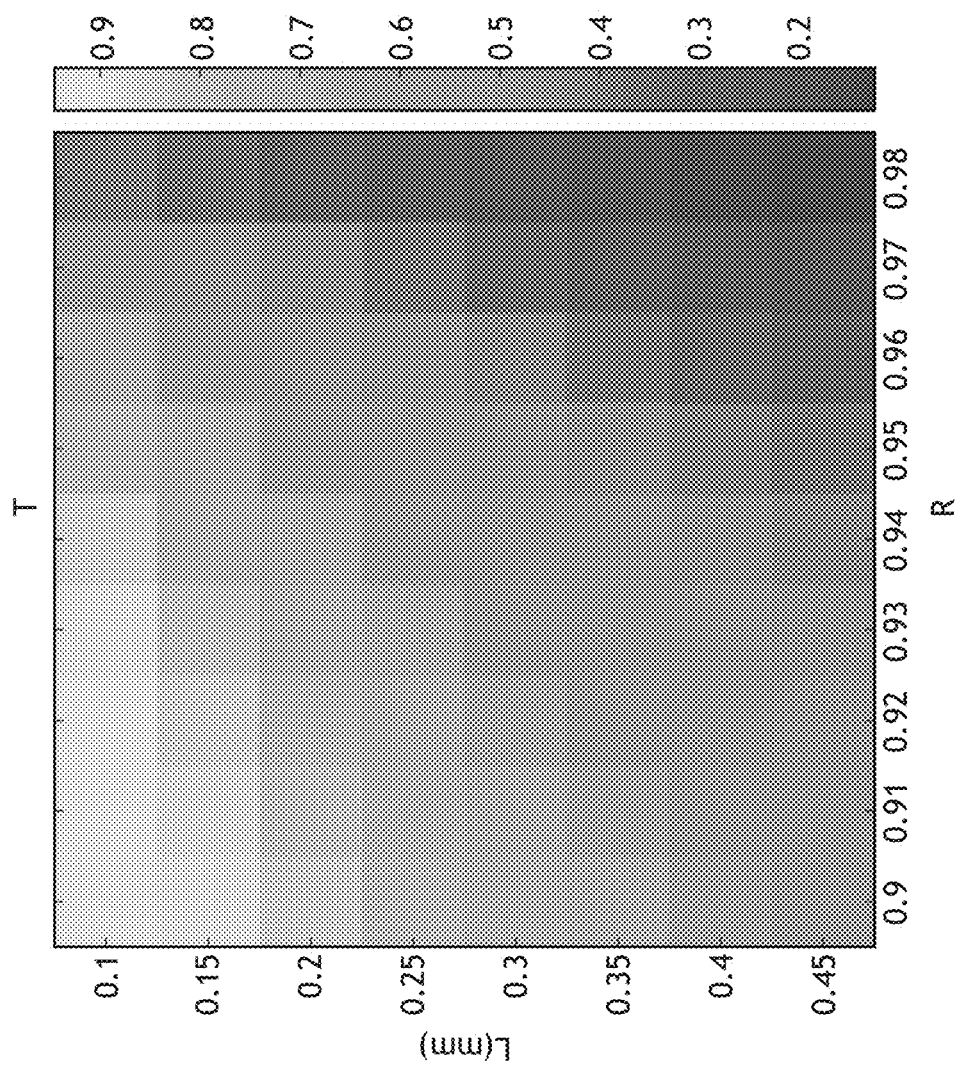
FIG. 2F is a plot of transmissivity of an etalon as a function of the reflectivity of the reflective surfaces as well as the separation between the reflective surfaces, in accordance with one or more embodiments of the present disclosure.

FIGS. 2E-2F further depict how the structure of the etalon 206 impacts linewidth and transmissivity of an etalon 206, in accordance with one or more embodiments of the present disclosure. FIG. 2E is a surface plot of linewidth (LW) of an etalon 206 as a function of the reflectivity R of the reflective surfaces 208 as well as the separation L between the reflective surfaces 208, in accordance with one or more embodiments of the present disclosure. FIG. 2F is a plot of transmissivity of an etalon 206 as a function of the reflectivity R of the reflective surfaces 208 as well as the separation L between the reflective surfaces 208, in accordance with one or more embodiments of the present disclosure. The data in FIGS. 2E-2F is based on input light 202 having a 20 ps pulse with a 3 pm linewidth and a center wavelength of 193 nm. It is to be understood that this is merely illustrative and should not be interpreted as limiting the scope of the present disclosure.

Figure 3A:
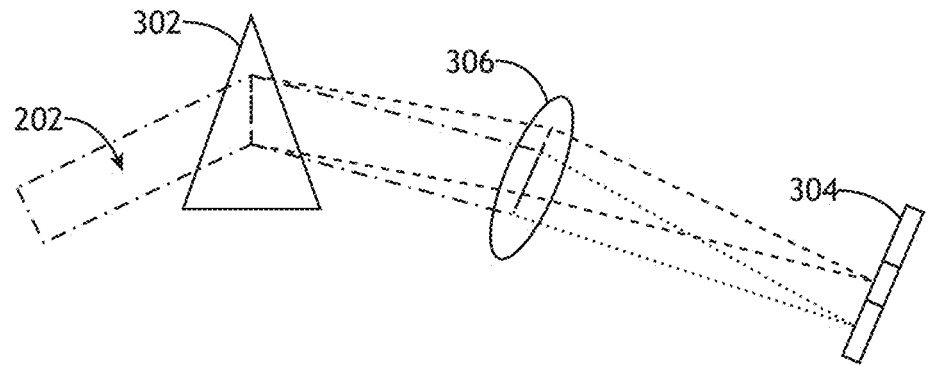
FIG. 3A is a simplified schematic of a tunable spectral filter including a dispersive element formed as a prism, in accordance with one or more embodiments of the present disclosure.
Figure 3B:
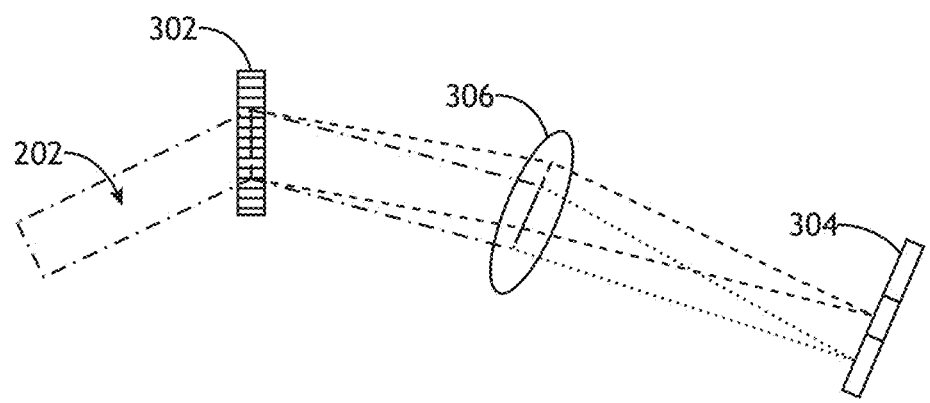
FIG. 3B is a is a simplified schematic of a tunable spectral filter including a dispersive element formed as a diffraction grating, in accordance with one or more embodiments of the present disclosure.
Figure 3C:
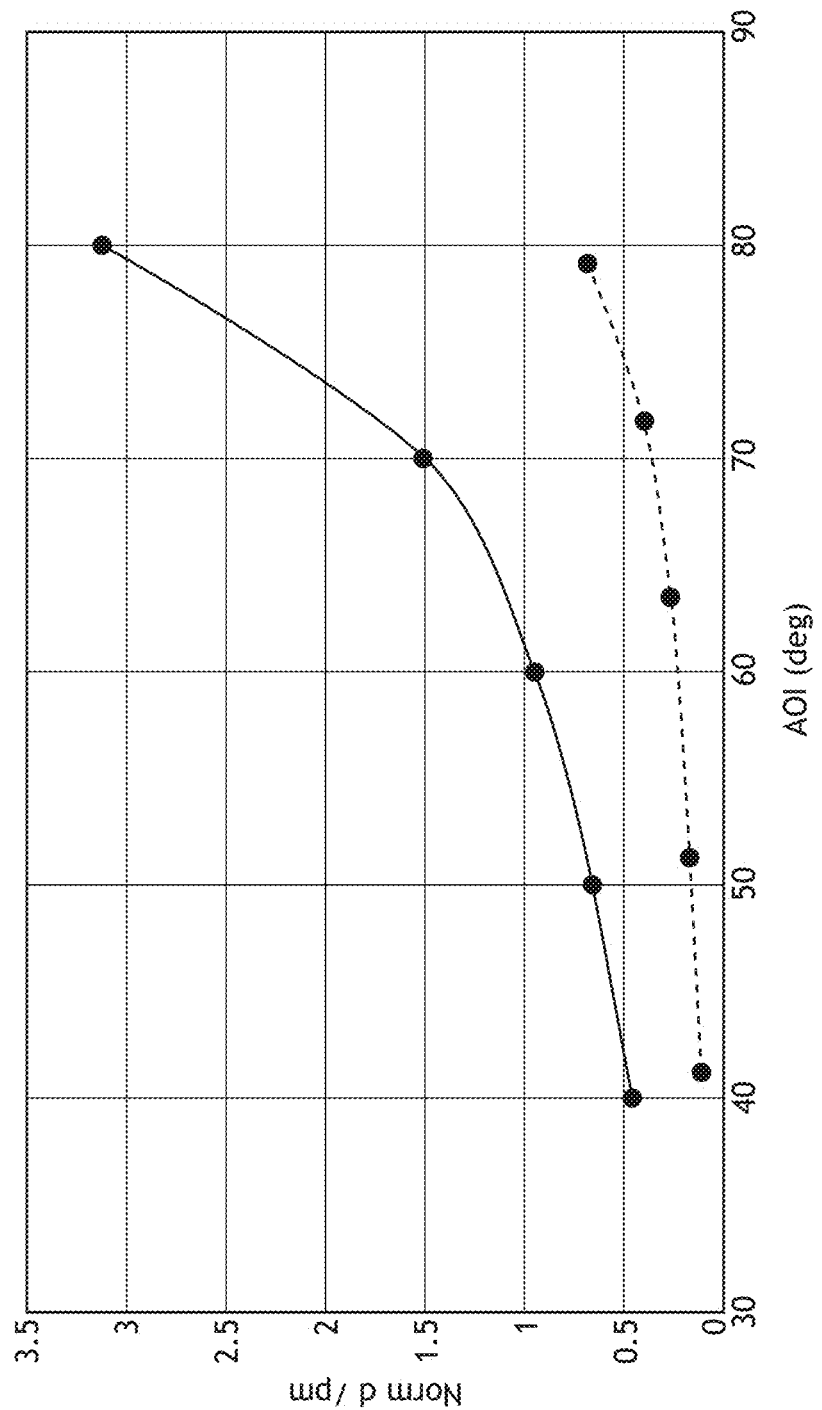
FIG. 3C is a plot depicting the normalized wavelength separation for a prism and a grating in a Littrow configuration, in accordance with one or more embodiments of the present disclosure.

FIGS. 3A-3C depict variations of a tunable spectral filter 120 formed from at least one dispersive element 302 and a spatial filter 304. Any type of dispersive element 302 or spatial filter 304 are within the spirit and scope of the present disclosure. For example, the dispersive element 302 may include a diffraction grating, a prism, or the like. As another example, the spatial filter 304 may include an aperture, beam block, or the like suitable for passing a selected portion of a spectrally-spread (e.g., spatially-dispersed) spectrum from the dispersive element 302.

FIG. 3A is a simplified schematic of a tunable spectral filter 120 including a dispersive element 302 formed as a prism, in accordance with one or more embodiments of the present disclosure. FIG. 3B is a is a simplified schematic of a tunable spectral filter 120 including a dispersive element 302 formed as a diffraction grating, in accordance with one or more embodiments of the present disclosure. FIGS. 3A and 3B further depict a lens 306 suitable for focusing the spectrally-spread input light 202.

In this configuration, the dispersive element 302 may spatially spread a spectrum of input light 202 and the spatial filter 304 may pass selected spectral components. The tunable spectral filter 120 may then recombine the passed spectral components with either by propagating back through the dispersive element 302 (e.g., if the spatial filter 304 reflects passed portions of the input light 202 as filtered light 204) or through an additional dispersive element (e.g., if the spatial filter 304 transmits portions of the input light 202 as filtered light 204).

It is contemplated herein that the type and configuration of a dispersive element 302 may impact various aspects of the tunable spectral filter 120 including, but not limited to, a sensitivity of spectral control, a transmissivity (e.g., efficiency), or a linewidth of filtered light 204. As an illustration, the sensitivity of the tunable spectral filter 120 for providing spectral control may be characterized by a normalized wavelength separation metric δd/d, where δd is spatial separation of the spots focused by lens 306 at spatial filter 304 of a wavelength within the spectral linewidth, d is the spot size focused by lens 306 at spatial filter 304 of the center wavelength. This ratio metric of δd/d defines the spectral filter performance.

For example, the normalized wavelength separation of a prism according to this metric may be characterized as:

$$\frac{\delta d}{d} = \frac{D_0}{\lambda} \cdot \frac{1}{n} \cdot \frac{dn}{d\lambda} \delta\lambda \tan\theta_0, \quad (6)$$

where $D_0$ is a diameter of the input light 202, n is a refractive index of the prism, $dn/d\lambda$ is a dispersion of the prism, $\lambda$ is a central wavelength of the input light 202, $\delta\lambda$ is a linewidth of the input light 202, and $\theta_0$ is an incidence angle of the input light 202.

As another example, the normalized wavelength separation of a grating with a normal incidence angle of the input light 202 may be characterized by:

$$\frac{\delta d}{d} = \frac{1}{2.44} \sin\theta \cdot \frac{D_0}{\lambda} \cdot \frac{\delta\lambda}{\lambda}, \quad (7)$$

where θ is an exit angle of diffracted light from the grating. In the case of a Littrow configuration, the normalized wavelength separation may be characterized by:

$$\frac{\delta d}{d} = \frac{1}{1.22} \tan\theta \cdot \frac{D_0}{\lambda} \cdot \frac{\delta\lambda}{\lambda}. \quad (7)$$

FIG. 3C is a plot depicting the normalized wavelength separation for a prism and a grating in a Littrow configuration, in accordance with one or more embodiments of the present disclosure. As shown in FIG. 3C, the grating in the Littrow configuration may provide greater normalized wavelength separation than a prism for a given angle of incidence θ.

Referring now to FIGS. 2A-3C, it is contemplated herein that different implementations of a tunable spectral filter 120 may provide different tradeoffs between parameters such as, but not limited to, size, transmissivity (e.g., efficiency), linewidth control, alignment tolerances, or manufacturability. For example, a tunable spectral filter 120 including an etalon 206 may provide a relatively compact solution, but may provide relatively low transmissivity, require sensitive alignment (and thus may be sensitive to vibrations or other mechanical movements), provide a relatively large linewidth, and/or require relatively large internal intensities between the reflective surfaces 208 (and thus may be power limiting). As another example, a tunable spectral filter 120 including a prism as a dispersive element 302 along with a spatial filter 304 may provide relatively high transmissivity and good alignment tolerances, but may be physically large, require correspondingly large beam sizes, and/or provide a relatively large linewidth. As another example, a tunable spectral filter 120 including a grating as a dispersive element 302 along with a spatial filter 304 may provide a relatively narrow linewidth and good alignment tolerances, but may provide relatively low efficiency and be challenging to manufacture for ultraviolet wavelengths.

It is further to be understood that FIGS. 2A-3C are provided solely for illustrative purposes and should not be interpreted as limiting the scope of the disclosure. Rather, the tunable spectral filter 120 may include any component or combination of components suitable for controlling a spectrum of the illumination beam 104 and/or sample light 116.

Referring again to FIG. 1A, various additional aspects of the inspection system 100 are described in greater detail, in accordance with one or more embodiments of the present disclosure.

The one or more processors 124 of a controller 122 may include any processing element known in the art. In this sense, the one or more processors 124 may include any microprocessor-type device configured to execute algorithms and/or instructions. In embodiments, the one or more processors 124 may consist of a desktop computer, mainframe computer system, workstation, image computer, parallel processor, or any other computer system (e.g., networked computer) configured to execute a program configured to operate the inspection system 100, as described throughout the present disclosure. It is further recognized that the term "processor" may be broadly defined to encompass any device having one or more processing elements, which execute program instructions from a non-transitory memory 126. Further, the steps described throughout the present disclosure may be carried out by a single controller 122 or, alternatively, multiple controllers. Additionally, the controller 122 may include one or more controllers housed in a common housing or within multiple housings. In this way, any controller or combination of controllers may be separately packaged as a module suitable for integration into inspection system 100.

The memory 126 may include any storage medium known in the art suitable for storing program instructions executable by the associated one or more processors 124. For example, the memory 126 may include a non-transitory memory medium. By way of another example, the memory 126 may include, but is not limited to, a read-only memory (ROM), a random-access memory (RAM), a magnetic or optical memory device (e.g., disk), a magnetic tape, a solid-state drive, and the like. It is further noted that memory 126 may be housed in a common controller housing with the one or more processors 124. In embodiments, the memory 126 may be located remotely with respect to the physical location of the one or more processors 124 and controller 122. For instance, the one or more processors 124 of controller 122 may access a remote memory (e.g., server), accessible through a network (e.g., internet, intranet, and the like). Therefore, the above description should not be interpreted as a limitation on the present invention but merely an illustration.

The controller 122 may further be communicatively coupled with any of the components of the inspection system 100. The controller 122 may thus receive data from any such components and/or may direct or otherwise control any such components via one or more control signals. In this way, the controller 122 (e.g., via the one or more processors 124), may implement and/or direct the implementation of any process steps described herein.

Figure 4:
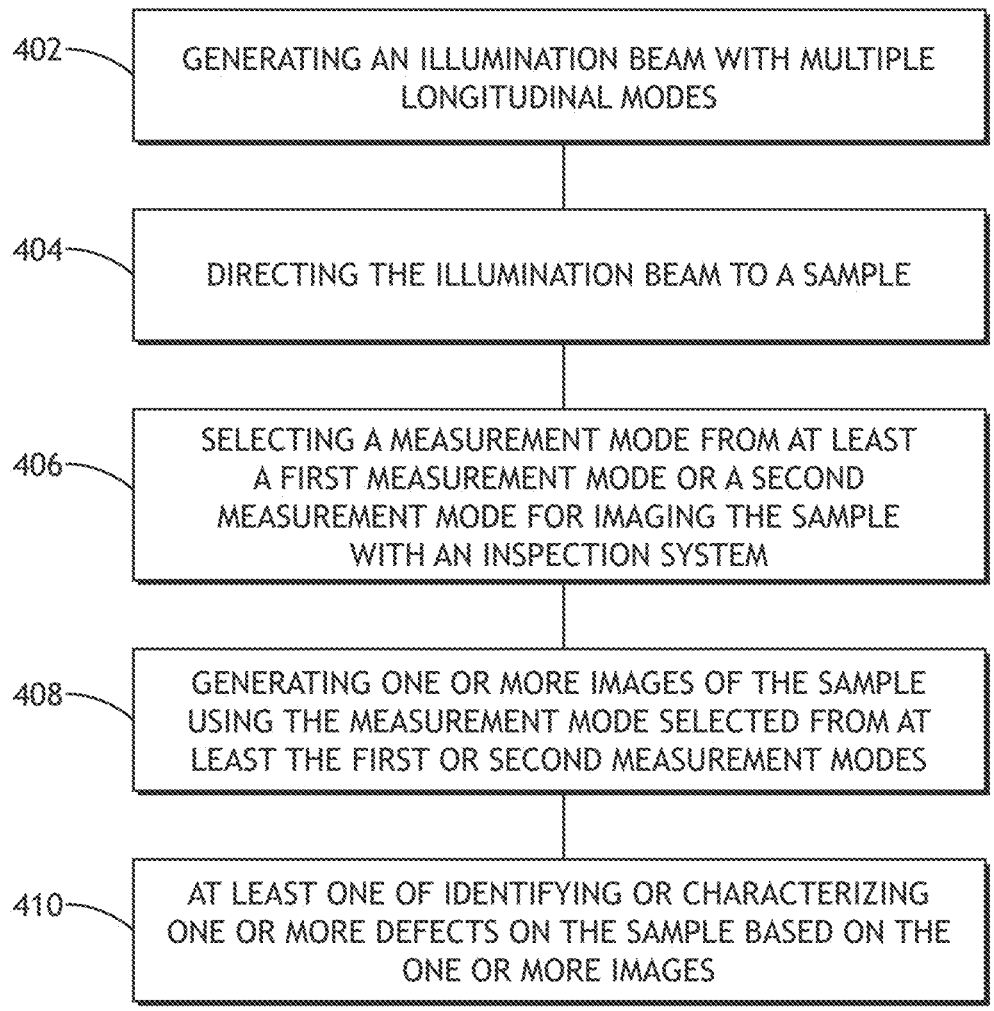
FIG. 4 is a flow diagram illustrating steps performed in a method for defect inspection, in accordance with one or more embodiments of the present disclosure.

FIG. 4 is a flow diagram illustrating steps performed in a method 400 for defect inspection, in accordance with one or more embodiments of the present disclosure. Applicant notes that the embodiments and enabling technologies described previously herein in the context of the inspection system 100 should be interpreted to extend to the method 400. It is further noted, however, that the method 400 is not limited to the architecture of the inspection system 100.

FIG. 4 is a flowchart of an example inspection method, in accordance with one or more embodiments of the present disclosure.

In embodiments, the method 400 includes a step 402 of generating an illumination beam 104. The illumination beam 104 may have multiple longitudinal modes such that the linewidth used for imaging may be adjusted. For example, the illumination beam 104 may be a pulsed beam (e.g., from a mode-locked laser source or any other suitable source) or a CW beam having multiple longitudinal modes.

In embodiments, the method 400 includes a step 404 of directing the illumination beam 104 to a sample 110. The step 404 may include directing the illumination beam 104 to the sample 110 at any suitable angle.

In embodiments, the method 400 includes a step 406 of selecting a measurement mode from at least a first measurement mode or a second measurement mode for imaging the sample 110 with an inspection system 100. For example, the first measurement mode may provide a relatively larger linewidth for at least the illumination beam 104 or sample light 116 collected from the sample 110, which may result in higher chromatic aberration by the objective lens in the first measurement mode relative to the second measurement mode. Further, the image pixel size may be larger for the first measurement mode than for the second measurement mode. In this way, the first measurement mode may be suitable for, but is not limited to, applications where surface haze from the sample 110 is relatively low and/or suppressed by the imaging sub-system 112. In some applications, the first measurement mode is used when sensor noise (e.g., noise from a detector 118) is the dominant noise source. In this case, the SNR of defects on the sample 110 may be increased by increasing the image pixel size. Further, the larger image pixel size may tolerate more chromatic aberration associated with the relatively larger linewidth. The second measurement mode may be suitable for, but not limited to, applications where surface haze from the sample 110 is relatively high and in some cases is the dominant noise source. In this case, the SNR of defects may be increased by decreasing the image pixel size. Further, the linewidth may be reduced to provide a diffraction-limited PSF or at least a PSF smaller than the image pixel size.

However, it is to be understood that the description of the first and second measurement modes is merely illustrative and should not be interpreted as limiting the scope of the present disclosure. For example, the step 406 may include selecting an additional measurement mode in some applications. In a general sense, an inspection system 100 may be configurable to operate in any number of measurement modes. As an illustration, the spectral linewidth used to generate an image (e.g., a linewidth associated with the illumination beam 104 and/or the sample light 116 passed to a detector 118) and/or the image pixel size may be adjusted to any values in any number of measurement modes. As an illustration, the spectral linewidth and/or the image pixel size may be adjusted to maximize a SNR of defects within a tolerance based on any imaging conditions.

The spectral linewidth used to generate an image of the illumination beam 104 and/or the sample light 116 (e.g., a spectral linewidth) may be adjusted using any technique known in the art. For example, the spectral linewidth may be adjusted using a tunable spectral filter 120. Further, the spectral linewidth may be adjusted by controlling a linewidth of the illumination beam 104 prior to the sample 110 or by controlling a linewidth of the sample light 116 passed to a detector 118.

The image pixel size may be adjusted using any technique known in the art. For example, the image pixel size may be adjusted by controlling a magnification (e.g., an optical magnification) of the imaging sub-system 112 used to generate an image of the sample 110. As another example, the image pixel size may be adjusted by selecting a detector 118 from multiple available detectors 118 having different sensor pixel sizes.

In embodiments, the method 400 includes a step 408 of generating one or more images of the sample using the selected measurement mode. In embodiments, the method 400 includes a step 410 of at least one of identifying or characterizing one or more defects on the sample based on the one or more images.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
an illumination source configured to generate an illumination beam;
an illumination sub-system including one or more illumination optics configured to direct the illumination beam to a sample;
an imaging sub-system comprising:
an objective lens configured to collect sample light from the sample in response to the illumination beam, wherein the objective lens exhibits chromatic aberration within a spectrum of the illumination beam; and
one or more detectors to image the sample based on at least a portion of the sample light collected by the objective lens, wherein an image pixel size is adjustable, wherein the image pixel size is a size of pixels of the one or more detectors projected to a plane of the sample; and
a tunable spectral filter with an adjustable linewidth configured to selectively adjust a spectrum of at least one of the illumination beam or the sample light, wherein the imaging sub-system and the tunable spectral filter are configurable according to at least a first measurement mode and a second measurement mode, wherein the first measurement mode provides a relatively larger linewidth and a relatively larger image pixel size than the second measurement mode.

2. The inspection system of claim 1, wherein the image pixel size is adjustable by controlling a magnification of the imaging sub-system.

3. The inspection system of claim 1, wherein the first measurement mode provides a relatively higher chromatic aberration by the objective lens than the second measurement mode.

4. The inspection system of claim 1, further comprising a controller communicatively coupled to at least one of the tunable spectral filter or the imaging sub-system, wherein the controller includes one or more processors configured to execute program instructions causing the one or more processors to:
receive one or more images of the sample from the one or more detectors; and
at least one of identify or characterize one or more defects on the sample based on the one or more images.

5. The inspection system of claim 1, wherein the illumination source comprises a pulsed laser.

6. The inspection system of claim 5, wherein the illumination beam includes pulses with temporal pulse widths greater than approximately 1 picometer.

7. The inspection system of claim 5, wherein the illumination beam includes pulses with temporal pulse widths greater than approximately 10 picometers.

8. The inspection system of claim 1, wherein the tunable spectral filter adjusts the spectrum of the illumination beam.

9. The inspection system of claim 8, wherein the tunable spectral filter is located within the illumination source.

10. The inspection system of claim 8, wherein the tunable spectral filter is located between the illumination source and the sample.

11. The inspection system of claim 1, wherein the tunable spectral filter adjusts the spectrum of the sample light.

12. The inspection system of claim 1, wherein the spectrum of the illumination beam includes wavelengths in an ultraviolet spectral (UV) range or lower.

13. The inspection system of claim 1, wherein the tunable spectral filter comprises:
an etalon.

14. The inspection system of claim 1, wherein the tunable spectral filter comprises:
one or more prisms; and
a spatial filter.

15. The inspection system of claim 1, wherein the tunable spectral filter comprises:
one or more diffraction gratings; and
a spatial filter.

16. The inspection system of claim 1, further comprising:
a haze mask when operating in at least the first measurement mode, wherein the haze mask is configured to pass light scattered from one or more particles on the sample and suppress scattered light from a surface of the sample.

17. The inspection system of claim 16, wherein the haze mask comprises:
a waveplate; and
a polarizer.

18. An inspection method comprising:
generating an illumination beam;
directing the illumination beam to a sample;
selecting a measurement mode from at least a first measurement mode or a second measurement mode for imaging the sample with an inspection system, wherein the inspection system includes an imaging sub-system comprising:
an objective lens configured to collect sample light from the sample in response to the illumination beam, wherein the objective lens exhibits chromatic aberration within a spectrum of the illumination beam; and
one or more detectors to image the sample based on at least a portion of the sample light collected by the objective lens, wherein an image pixel size is adjustable, wherein the image pixel size is a size of pixels of the one or more detectors projected to a plane of the sample, wherein the inspection system further includes a tunable spectral filter with an adjustable linewidth configured to selectively adjust a spectrum of at least one of the illumination beam or the sample light, wherein the first measurement mode provides a relatively larger linewidth and a relatively larger image pixel size than the second measurement mode;
generating one or more images of the sample using the measurement mode selected from at least the first measurement mode or the second measurement mode; and
at least one of identifying or characterizing one or more defects on the sample based on the one or more images.

19. An inspection system comprising:
a controller communicatively coupled to at least one of an illumination source configured to generate an illumination beam, an illumination sub-system including one or more lenses configured to direct the illumination beam to a sample, an imaging sub-system, or a tunable spectral filter, wherein the imaging sub-system comprises:
an objective lens configured to collect sample light from the sample in response to the illumination beam, wherein the objective lens exhibits chromatic aberration within a spectrum of the illumination beam; and
one or more detectors to image the sample based on at least a portion of the sample light collected by the objective lens, wherein an image pixel size is adjustable, wherein the image pixel size is a size of pixels of the one or more detectors projected to a plane of the sample;

wherein the tunable spectral filter provides an adjustable linewidth configured to selectively adjust a spectrum of at least one of the illumination beam or the sample light, wherein the imaging sub-system and the tunable spectral filter are configurable according to at least a first measurement mode and a second measurement mode, wherein the first measurement mode provides a relatively larger linewidth and a relatively larger image pixel size than the second measurement mode; and wherein the controller includes one or more processors configured to execute program instructions causing the one or more processors to:

receive one or more images of the sample from at least one of the one or more detectors; and at least one of identify or characterize one or more defects on the sample based on the one or more images.

20. The inspection system of claim 19, wherein the program instructions are further configured to cause the one or more processors to:

control at least one of the tunable spectral filter or the imaging sub-system to generate each of the one or more images in a selected measurement mode selected from one or more measurement modes including the first measurement mode and the second measurement mode.

21. The inspection system of claim 19, wherein the image pixel size is adjustable by controlling a magnification of the imaging sub-system.

22. The inspection system of claim 19, wherein the first measurement mode provides a relatively higher chromatic aberration by the objective lens than the second measurement mode.

23. The inspection system of claim 19, wherein the tunable spectral filter adjusts the spectrum of the illumination beam.

24. The inspection system of claim 19, wherein the tunable spectral filter adjusts the spectrum of the sample light.

25. The inspection system of claim 19, wherein the spectrum of the illumination beam includes wavelengths in an ultraviolet spectral (UV) range or lower.

* * * * *